United States Patent [19]
Becker

[11] 3,798,407
[45] Mar. 19, 1974

[54] PROCESS FOR WELDING SHEET METAL COATED WITH LAYERS

[76] Inventor: Otto Alfred Becker, Robert Koch Strasse 59, 66 Saarbruecken 6, Germany

[22] Filed: Sept. 16, 1971

[21] Appl. No.: 181,149

Related U.S. Application Data

[63] Continuation-in-part of Ser. No. 823,077, May 8, 1969, Pat. No. 3,614,375.

[52] U.S. Cl.................... 219/92, 219/90, 219/161
[51] Int. Cl............................................... B23k 9/28
[58] Field of Search........ 219/91, 92, 86, 138, 161, 219/90, 93

[56] References Cited
UNITED STATES PATENTS

| | | | |
|---|---|---|---|
| 3,337,711 | 8/1967 | Garscia | 219/92 |
| 3,252,203 | 5/1966 | Alberts et al. | 219/86 X |
| 3,515,841 | 6/1970 | King | 219/91 |
| 2,021,477 | 11/1935 | Bohn | 219/91 |
| 1,771,334 | 7/1930 | Jubb et al. | 219/138 X |
| 3,435,184 | 3/1969 | Schroeppel et al. | 219/91 X |
| 2,300,700 | 11/1942 | Porter et al. | 219/91 X |

FOREIGN PATENTS OR APPLICATIONS

| | | | |
|---|---|---|---|
| 15,469 | 8/1963 | Japan | 219/93 |
| 791,377 | 2/1958 | Great Britain | 219/161 |
| 697,396 | 9/1953 | Great Britain | 219/92 |

Primary Examiner—Bruce A. Reynolds
Attorney, Agent, or Firm—Erich M. H. Radde

[57] ABSTRACT

A method for the connection of sheet metal panels coated on at least one surface with a layer by the electrical fusion of a metal, wherein the improvement comprises the steps of supplying an electric current for the fusion of metal indirectly along the sheet metal of at least one panel to the zone at which said panels are to be connected to each other, and keeping the temperature of an outer layer of at least one of said panels below the melting point of said layer.

11 Claims, 67 Drawing Figures

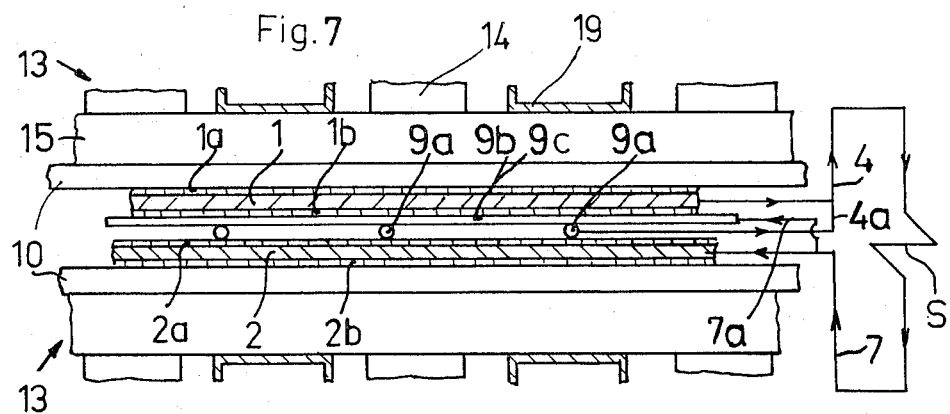
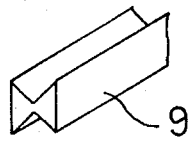
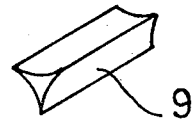
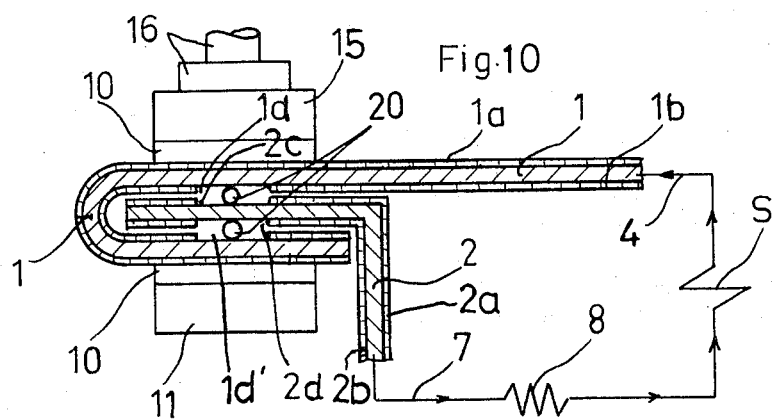
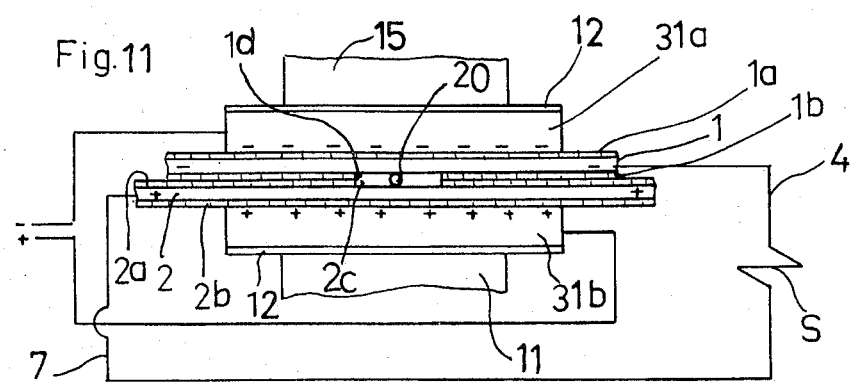

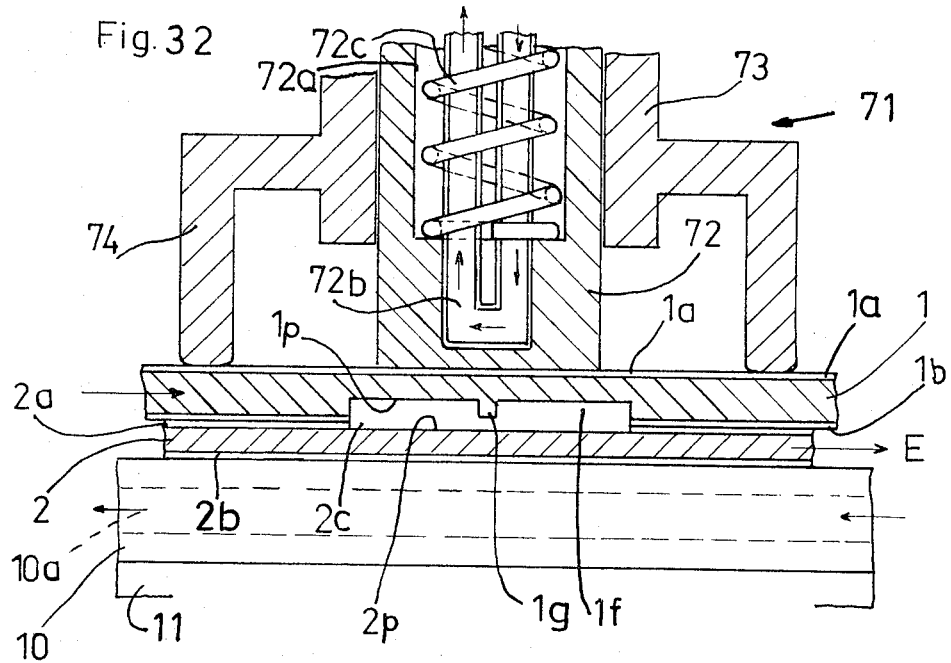
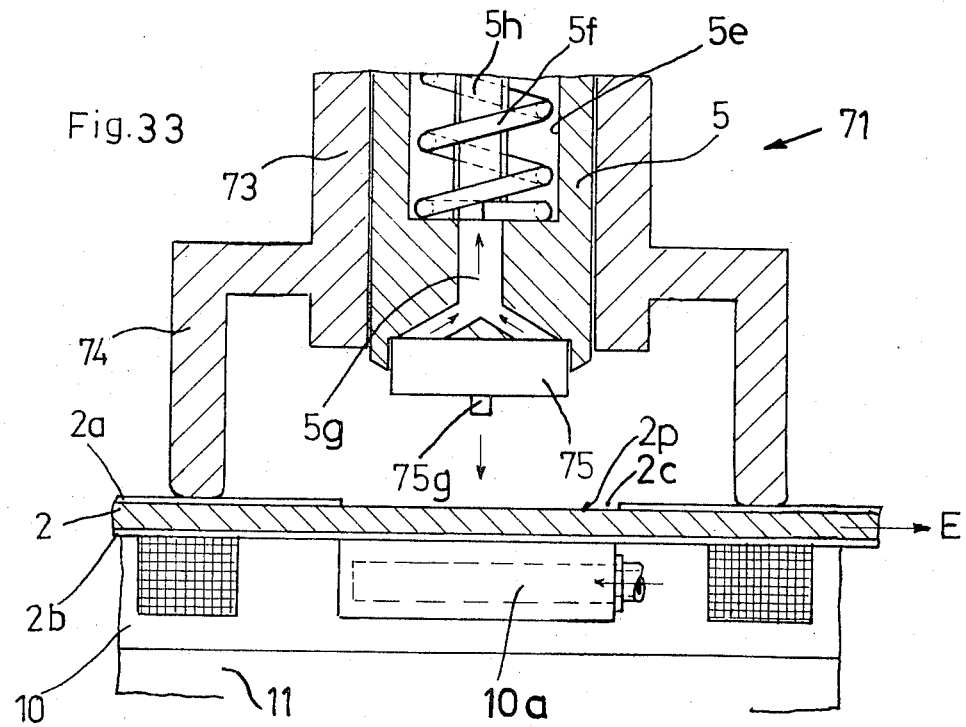

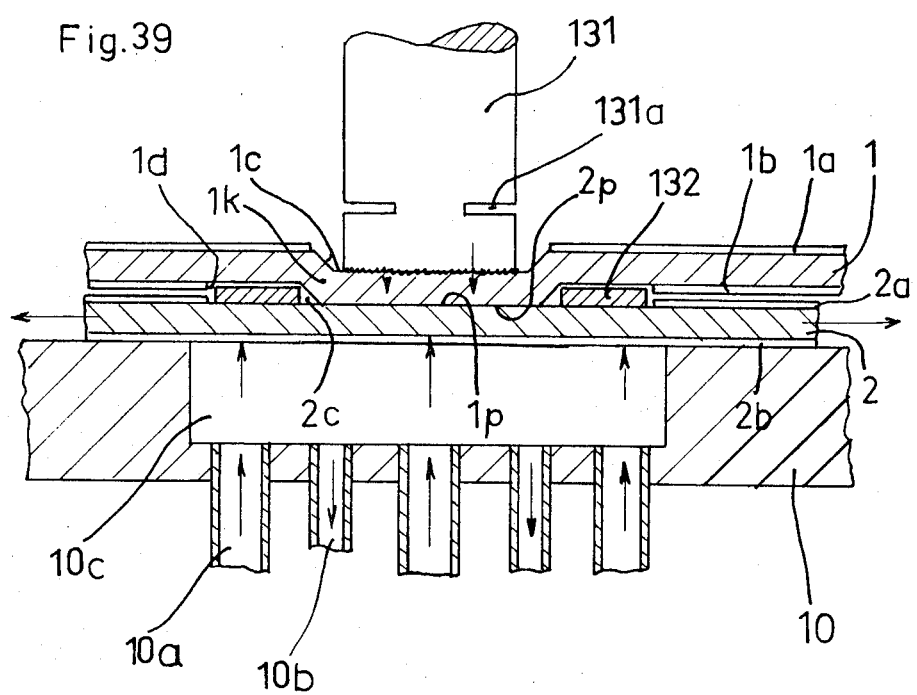

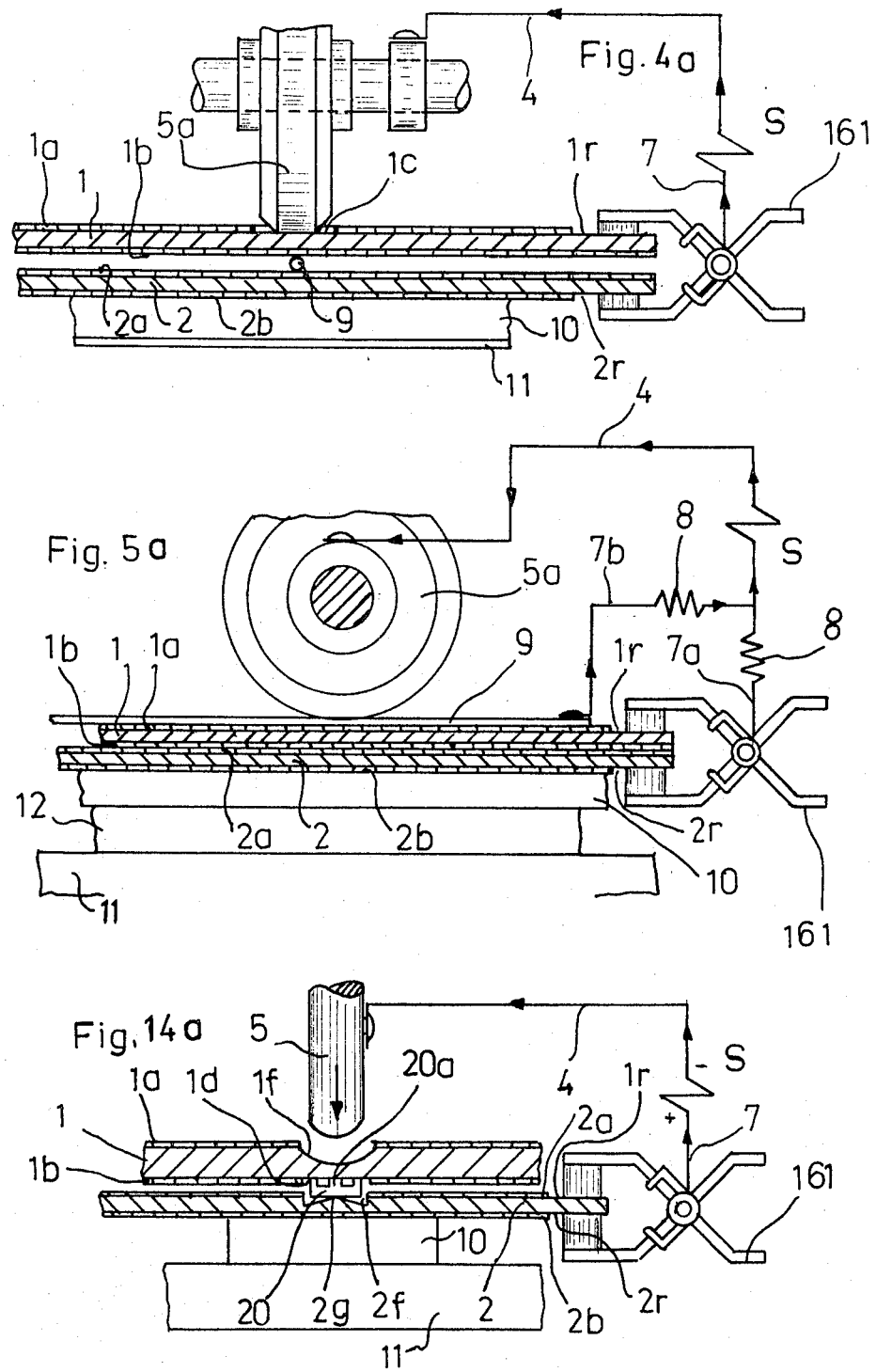

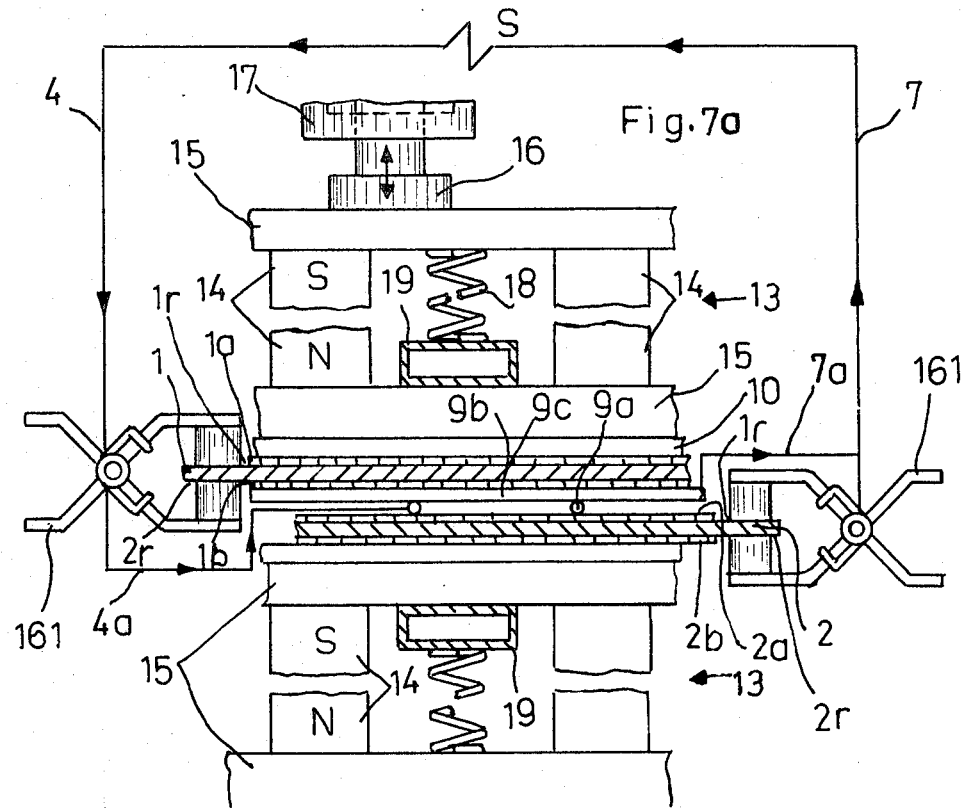
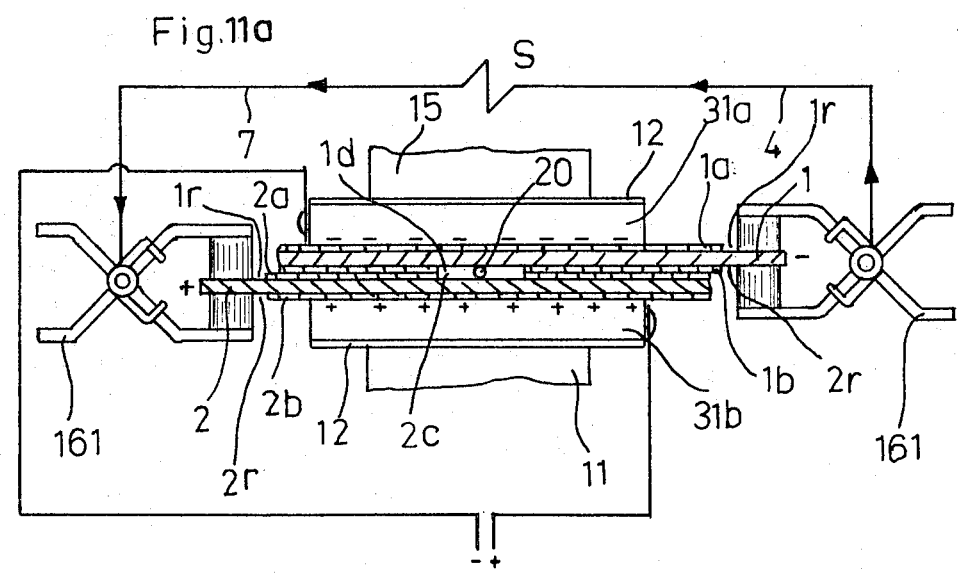

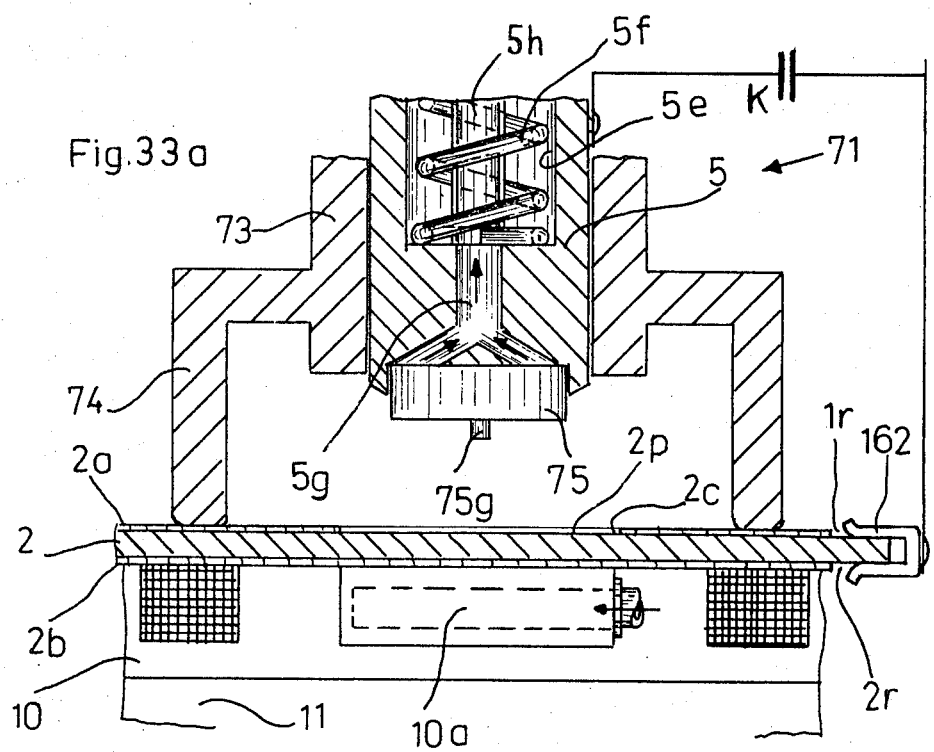
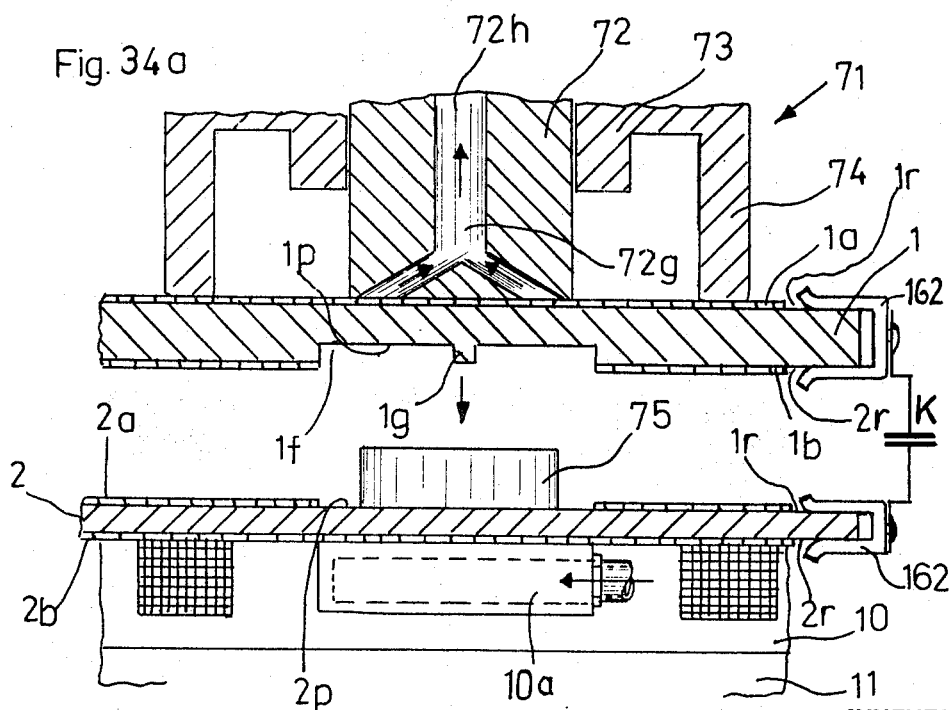

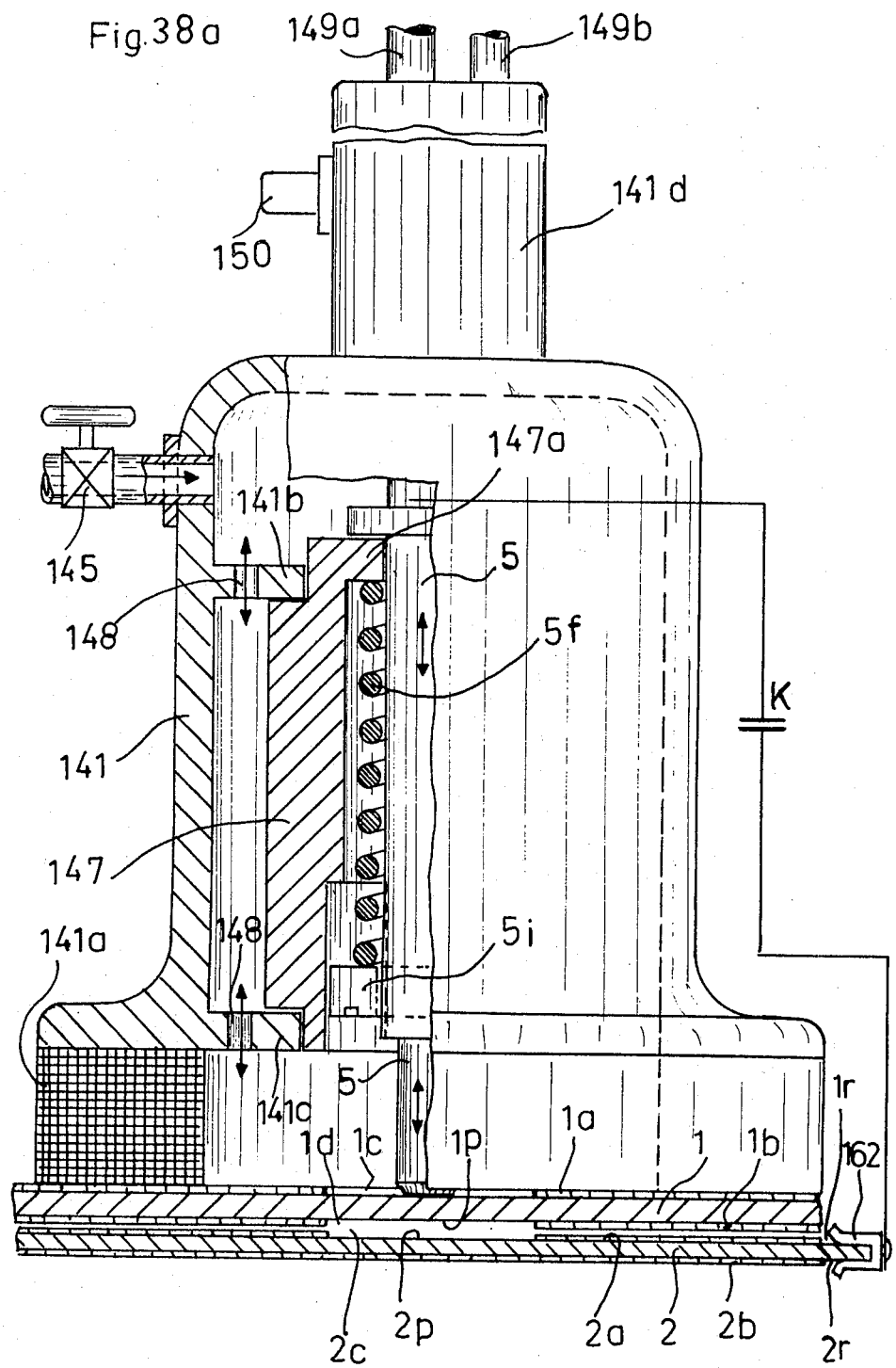

3,798,407

PROCESS FOR WELDING SHEET METAL COATED WITH LAYERS

CROSS-REFERENCE TO RELATED APPLICATION

This application is a continuation-in-part of copending application Ser. No. 823,077, filed May 8, 1969, now U.S. Pat. No. 3614375, and entitled WELDING OF SHEEL METAL COATED WITH LAYERS.

BACKGROUND OF THE INVENTION

1. Field of the Invention

The present invention relates to a process for connecting sheet metal panels and the like coated on at least one surface with layer such as an insulating layer by the electrical fushion of metal, and to an apparatus for carrying out said process.

2. Description of the Prior Art

Sheet metal panels coated, for instance, with an insulating coating such as with a plastic layer are known for many years. Due to their rust-free, insensitive surfaces such panels are available in many different patterns and colors. It is well known, however, that such metal panels cannot be connected to each other and interwelded economically with themselves or other metallic parts by spot- or roller-welding in the usual manner.

The present applicant has suggested to strip the sheet metal panels at the places to be welded in such a manner that an electrical contact is established when the sheet metal panels are pressed upon each other. With comparatively thick layers of plastic and the like insulating material and likewise with comparatively thick sheet metal panels the cavities formed by stripping the coating layers may be filled by inserted intermediate welding pieces. In this manner faultless welded connections can be produced with the usual welding machines on sheets of steel, chromium-nickel steel, aluminum or other metals coated with plastics, lacquers, or other materials, or having an oxide layer thereon. However, thereby the outer coatings of the stripped sheet metal panels are destroyed by stripping or melting under the electrodes.

SUMMARY OF THE INVENTION

It is one object of the present invention to provide a simple and effective process for welding sheet metal panels and the like metallic articles which are provided with a coating or layer of any kind, insulating or non-insulating but different in its composition from that of the metal base itself, whereby the destruction of at least one outer layer is prevented when welding.

Another object of the present invention is to provide a welding apparatus and the necessary accessories to carry out such a process.

Other objects of the present invention and advantageous features thereof will become apparent as the description proceeds.

The process of the present invention consists in welding together sheet metal panels or other articles which are provided with a coating of a material differing from that of the sheet metal itself and especially sheet metal panels provided with plastic layers or an oxide or phosphate or the like insulating layer whereby the welding current for at least one of the coated sheet metal panels is conducted indirectly to the welding zone through the sheet metal. To indirectly conduct the welding current to the welding zone requires that for at least one of the coated sheet metal panels the welding current is supplied to the welding zone or spot from one of the poles through a metallic surface area or spot by means of contact devices such as a non-welding contact electrode, contact tongs or clamps, or the like means into said sheet metal panel and through its surface to the predetermined welding zone or spot from where the welding current is conducted through the other sheet metal panel or through a welding electrode provided at the outer surface of the sheet metal panel above the welding zone or spot to the other pole, thereby welding the two sheet metal panels together. Therefrom the advantage results that the outer coating of at least one of the sheet metal panels remains undamaged, and that the welding is performed as an internal welding of the juxtapositioned surfaces of the sheet metal panels.

For welding two sheet metal panels to one another, which are coated on both sides, the upper sheet metal panel may be stripped on top of its coating for placing an electrode on it, while the lower sheet metal panel rests through a cooling plate and an insulator on the lower electrode. This lower electrode is connected by a cable to the lower sheet metal as well as to the upper sheet metal. When switching on the current the same flows firstly from the upper electrode through the upper sheet metal to the lower electrode, whereby the sheet metal is heated and the layer between the sheet metals melts. Under the pressure of the upper electrode the heated upper sheet metal bulges and comes into contact with the lower sheet metal. The current then flows to the lower electrode also through the lower sheet metal, and welds the two sheet metals to one another.

For welding an upper sheet metal panel to two lower sheet metal panels lying side-by-side, two separate electrodes may be used which are applied to stripped zones of the upper sheet metal panel. The lower sheet metal panels lying on a cooling plate are indirectly connected by cables to an opposite electrode. When switching on the current, firstly a heating current flows horizontally in the upper sheet metal, and after the melting of the coating layers a current flows perpendicularly through the two sheet metals whereby these panels are connected simultaneously on two points to each other.

When using an electrode and opposite annular electrode arranged co-axially to each other for welding, a common stripped zone is provided in the upper sheet metal panel. Moreover, the opposite electrode is connected to the lower sheet metal panel through cables. When switching on the current, firstly a heating current flows horizontally between the electrodes, and after the melting of the coating layers a welding current flows perpendicularly through the two sheet metal panels and welds the same to one another. The annular electrode limits the heating of the upper sheet metal panel to a small area.

For the purpose of roller-welding, the upper sheet metal panel is stripped over an elongated zone for the roller electrode, and between the sheet metal panels coated on both surfaces a wire is inserted along the weld seam to be produced. Both sheet metal panels are connected by cables to the opposite pole of the current zone. When switching on the current, a heating current flows horizontally through the upper sheet metal until the internal coating layers are melted; then the wire establishes contact between the sheet metal panels and a welding current welds the wire to the sheet metal panels. The wire may be additionally connected to the said opposite pole.

In accordance with a modification, the wire may be interposed between the welding roller and the upper layer of the upper sheet metal panel, and may be connected like the sheet metal panels through regulating resistors to said opposite pole. This method has the advantage that any stripping is dispensed with.

Alternatively both sheet metal panels may be connected indirectly to the poles of a secondary circuit, placed between cooling plates and pressed against each other by presser means. Between the sheet metal panels a row of wires may be interposed and connected at their ends each to one of said poles. According to a modification two rows of wires crossing one another may be interposed and electrically connected at opposite polarity. When the current is switched on, firstly a heating current flows, and after the melting of the coating layers a welding current. By applying a single pressure means a plurality of welding seams can thus be produced simutaneously. Both outermost coatings thus remain undamaged. Upper and lower vibrator devices may be provided for assisting the welding operation.

On the same principle the angled ends of sheet metal panels may be welded, e.g. those of partition walls. For this purpose the inner welding areas are to be stripped, welding pieces are to be inserted, and each sheet metal is to be connected to a pole of a secondary circuit. When switching on the current and the presser means, the sheet metal panels are welded to each other while the outer coatings remain undamaged.

The sheet metal panels to be welded to one another may moreover be placed between the upper and lower plates of a capacitor, in order to force the welding current flow towards the interior. Thus the warming of the external coatings of the sheet metal panels may be reduced.

According to a further embodiment of the method according to the present invention at least the indirectly connected sheet metal panel may be provided with milled recesses for leaving undamaged another outer coating. In a first example the milled recess leaves a small welding pin in existence, against which the stripped upper sheet metal panel is pressed by a small electrode, and is thus welded to it. In a second example both sheet metal panels are provided with welding pins, connected indirectly to a current source, and welded to each other through an interposed intermediate welding piece. In a third example the milled recess of the indirectly connected sheet metal leaves a central point standing, the intermediate welding piece is provided on top with a pin or with an annular edge, and the thickness of the upper sheet metal panel is reduced underneath the electrode. In a fourth example both inner surfaces of the sheet metal are provided with milled recesses of square cross section; in a fifth example with a recess of triangular cross section for accommodating a round intermediate welding piece. Thereby the contact areas are reduced practically to contact points or lines only, whereby the resistance of transistion is increased, and the size of the welding zone as well as its warming are reduced.

In accordance with a further embodiment an upper milled recess of the upper sheet metal panel may be provided with a dimple having a downwardly directed point, which may be welded to the other sheet metal by means of an electrode having an inserted resilient point. For this purpose a single milled recess only is to be provided. Moreover the outer layer lying underneath the welded area may be brought into direct contact with a coolant, apart from the use of cooling plates.

According to a further embodiment intermediate welding pieces of a low melting point material, e.g. of hard or soft solder, are used. Thus the panels need not be heated to the welding temperature of the sheet metal and their warming is reduced.

For the use of capacitor-pulse welding, blank metal surfaces may be formed on the internal welding areas, and thus the narrow gaps required for igniting an arc may be established. In the simplest case the two locally stripped internal coatings have together a thickness which corresponds to the gap required. With thicker coatings the gap may be established by impressing a pointed pressure punch. Moreover intermediate welding pieces having points or ribs projecting downwardly and upwardly may be inserted into the cavity formed by stripping, and the sheet metal panels themselves may be provided with sharp-edged ribs where they are being stripped. Through a bore in the upper sheet metal panel a pointed welding pin or a welding pin having an annular edge may be inserted, and pressed into the cavity during welding by a resilient pusher pin. Thus the cavity is filled. The upper sheet metal panel consequently remains plane.

For sheet metal panels coated on one side only, particularly of light metal, cavities are formed by the insertion of an insulating layer having holes for the insertion of very small intermediate welding pieces of high electrical resistance. These small welding pieces may consist of wire squeezed flat between the welding areas, and may be stuck to the perforated insulating strip.

The igniting of the electric arc may be initiated by the aid of welding pins as will be shown with reference to portable manual welding appliances. In accordance with a first embodiment of the upper sheet metal panel is provided with a milled out recess leaving a welding pin standing. The welding appliance capable of being placed on top by means of a tripod comprises a spring-loaded presser punch, by the impact of which on the sheet metal the electric arc is ignited and the welding is performed.

In accordance with a second embodiment firstly an intermediate welding piece with a welding pin is welded to the lower sheet metal panel by means of a spring-loaded electrode, and subsequently an upper sheet metal panel provided with welding pins is welded to the intermediate welding piece. The sheet metals are thus kept spaced apart.

In accordance with a third embodiment a welding pin having a holder flange is inserted into the cavity formed by the stripping through a bore in the upper sheet metal panel, and is welded on by the aid of a spring-loaded electrode.

In order to displace the flow of current towards the inner welding zone, the external surfaces of the sheet metal panels may be arranged between capacitor plates and the inner sheet metal surfaces may be separated by a capacitor foil of opposite polarity. Thus the warming of the outer coatings is reduced.

According to a further embodiment of the method according to the invention a welding area may be firstly warmed by resistance heating, and subsequently welded by the capacitor-pulse method by a change-over switch. The warming of the outer coating is thus reduced and the same is kept undamaged.

Finally the welding appliance may be placed within a vacuum bell and sealed about the zone to be welded in an air-tight manner by an interposed rubber ring. The contact pressure is then not limited to manual force.

It is evident from the foregoing explanation that the present invention is concerned with an advantageous process of resistance welding of metal sheets and metal parts composed of any type of metal which metal sheets or metal parts are provided with a coating of any type of material. Such coatings can be insulating layers of organic material such as lacquers and plastic material, or inorganic layers such as phosphatized steel sheet metals, i.e. the iron phosphate layers formed thereby on the surface of the sheet metal, or oxide layers and especially the aluminum oxide layers formed, for instance, within about one hour on aluminum panels after their manufacture by the action of the oxygen of the air. Of course, all sheet metal panels and the like which are covered by the metal oxide or rust have also such insulating inorganic layers which heretofore prevented proper welding. Metal-coated sheet metal panels can also advantageously be welded according to the process of this invention, such as galvanized or zinc-coated, tin-plated, or brass-coated, and any plated sheet metal panel, to which metal foils, and especially foils of highly valuable metals, such as non-rusting metals have been applied by rolling. Such metal-coated sheet metal panels cannot be properly welded together because, for instance, galvanized or tin-plated sheet metals have the tendency to readily alloy with the copper electrodes thus considerably reducing the usefulness of such electrodes and their operativeness.

According to the present invention, as explained hereinabove, said plastic, oxide, phosphate, metallic, and the like layers on the sheet metals to be welded are removed, at least partly, from said sheet metal either on one of their outer surfaces or at their inner surfaces of the sheet metals to be welded, by milling in a predetermined geometrically well defined area, preferably cylindrical area, and/or in the form of a groove or arcuate or rectangular cross-section. Thereby milling is continued until at least a blank welding area composed of the basic metal is achieved. Thereafter, the sheet metal panels with the exposed blank metal surfaces are juxtapositioned with their welding areas. To effect welding of said partly stripped sheet metal panels or parts, welding contact is effected between said juxtapositioned inner faces of the welding areas whereafter welding is effected. According to the present invention the welding current is supplied at least through one of the sheet metal panel parallel with its surface indirectly to the welding area and is conducted from said sheet metal surface to the counter pole in any desired manner, for instance, through the other sheet metal panel. For this purpose at least one of the sheet metal panels is connected to the counterpole of the welding machine by means of contact auxiliary electrodes, contact tongs, contact clamps, or the like or by means of cables. On removing the outer coatings from the sheet metal panels or the like articles by milling at those places where the welding electrodes are to be attached, the milling cutter produces exactly geometrically formed metal parts of a very smooth and level at precisely predetermined depth and preferably by limiting to a minimum the surface from which the coating is removed from one or both sides of the panel. Thus a precisely predetermined and preselected electric resistance of the welding area is achieved. Removal of the coating or coatings by milling cutters and the extraordinarily smooth surface of the cut achieved thereby produces the important advantage that the service life of the electrodes is prolonged very considerably. The recesses produced by removal of the coatings provided at the outer surface of the sheet metal panels to be welded can be of concave or convex shape. At the same time they can be profiled in accordance with the special requirements. Accordingly the working surfaces of the electrodes, i.e. the electrode contact surfaces can be adjusted to the shape and profile of the welding areas or spots. The additionally required removal of the coating for attaching thereto auxiliary contact electrodes or the contact tongs or contact clamps or the like can also be produced by milling in any desired profile or in planar arrangement of a smooth and level geometrical pattern. Preferably the layers are removed at said places in a geometrical pattern of a size required to introduce into the plane of the sheet metal an electric current of such a strength that the coatings, for instance, the decorative layers surrounding the milled area are not affected by the temperature increase of the metal sheet which may be caused by the contact area being too small. The very smooth milled recesses which are, for instance, of circular shape or in the form of strips, are also of value for attaching thereon the auxiliary electrodes, contact tongs, contact clamps, and the like because they have the advantage that optimum service life of said contact electrodes, tongs, clamps, and the like is achieved by providing proper and complete connection of said contact devices to the metal sheet and thus unimpeded transfer of the electric current into the metal sheet.

In the intermediate layers or coatings between the metal sheet panels to be welded consist at the welding areas or spots of fusible or readily destroyable material, it is not necessary to remove said layers or coatings before welding. The electric current flowing from the welding electrode to the auxiliary electrode, the contact tongs, the contact clamps, or the like, causes heating of the sheet metal under the welding electrode. Such heating causes melting or destruction of the intermediate coating or coatings between the sheet metals and thereafter contact of the two metal sheet panels themselves, i.e. of the carrier or basic metal plates due to the pressure of the welding electrode. As a result thereof the electric current is conducted through the plane of the second metal sheet to the outer pole. Thus it is possible to retain the outer surface of the second metal sheet in completely non-damaged form.

According to the present invention it is also possible to keep both outer surfaces and coatings of the metal sheet panels to be welded in completely undamaged form. For this purpose it is sufficient to remove only the coatings or layers provided at the inner surfaces of the metal sheets at the predetermined welding areas or spots and to effect fine contact of the inner welding areas by means of current-less pressure stamps whereby an extremely high electric resistance is produced. In this modification of the present invention the welding current is conducted through the one sheet metal panel by way of an auxiliary electrode, contact tongue or contact clamps to the inner welding area or spot and through the contact bridge of the welding area or spot into the other sheet metal and through its plane, for instance, by way of contact tongs or contact clamps to the counterpole. By shaping the inner welding areas or spots in any desired predetermined manner by milling, for instance, by removing the coatings on the opposed surfaces of the sheet metal panels and having a pointed welding pin or ring in one of the milled recesses it is possible to achieve optimum, exactly predetermined extremely high electrical resistances which allow to achieve exactly predetermined welding results by carrying out the welding within an exactly predetermined welding time of a few thousandths of a second under an accordingly predetermined pressure and with a predetermined electric voltage. Such results can be reproduced uniformly at all welding areas or spots of like shape and area. Thus it is possible to avoid any damage of the outer coatings or layers.

In place of providing such predetermined and precalculated profiled milled welding pins, central points, annular contact points and the like at the inner surfaces of the sheet metal panels to be welded, it is, of course, also possible to insert into the recesses profiled intermediate welding pieces, such as disks provided with fine, pointed buckles extending upwardly and downwardly or disks with projection which are bent upwardly and downwardly, said disks having a predetermined electrical resistance. When using such disks with projections, it is possible to even leave the coatings at the welding areas or spots of the opposed inner surfaces of the sheet metal panels because the projections penetrate said coatings in upward and downward direction under the pressure of the current-less pressure stamp whereby contact between the two inner surfaces of the sheet metal panels to be welded is effected. When the opposed surfaces of the sheet metal panels are freed from their coatings, care must be taken that the geometrically stripped welding areas are facing each other exactly and thus form a geometric cavity which is produced by the remaining surrounding coating layers. Said cavity or hollow space is especially suited to receive the welding inserts.

If welding is effected by means of a welding roller, the opposed inner surfaces of the juxtapositioned sheet metal panels are stripped of the coatings in the form of strips, for instance, by means of milling rollers. In place of stripping the coatings to form strip-like, profiled recesses, there may be inserted elongated welding inserts, for instance, wires of a predetermined electrical resistance and/or wires having sharp-edged profiles or metal strips with embossed recesses and/or projections extending to both surfaces.

It is to be understood that not only spot welding but also roller welding can be carried out in such a manner that both outer surfaces of the sheet metal panels to be welded can remain undamaged and that welding of the inner opposed surfaces of the panels can be effected without affecting and damaging the outer coatings or layers. For this purpose a current-less pressure roller is placed upon the outer surfaces of the upper sheet metal panel above the starting point of the welded seam. The welding current is supplied to at least one of the sheet metal panels, for instance, at several stripped auxiliary contact areas, by means of a contact roller electrode, for instance, along a stripped edge or border regions of one of said sheet metal panels.

Usually the coatings are of a combined type, i.e. they consist of several layers. Thus, for instance, steel panels can first be provided with an inorganic layer, for instance, by phosphatizing. An adhesive layer may then be applied to said phosphate layer and a decorative plastic foil may be rolled upon said adhesive layer.

According to another modification steel panels are provided with a zinc layer by dripping or by electrolytic deposition whereafter at least one of the zinc-plated surfaces is coated for ornamental or decorative purposes with a plastic foil or by rolling thereon a liquid plastic composition or by lacquering Another type of sheet metal panels to be welded according to the present invention are aluminum panels. Such panels have always an oxide layer on their surfaces which is formed by the action of the atmospheric oxygen within one hour upon a metal-blank aluminum surface. Such an oxide layer can be provided with other layers, for instance, with an adhesive layer and a plastic foil attached thereto or with a plastic layer rolled upon the aluminum panel. The oxide layer alone cannot be welded properly. Therefore, it is to be removed shortly before welding by milling or profiled milling in the same manner as other coatings are stripped. Thereby the unfavorable and too high conductivity is reduced to optimum values by suitable profiling and shaping of the welding area so that a predetermined optimum resistance is achieved. In addition the welding area with its blank metallic aluminum surface as it is obtained by milling, can be progressively reoxidized so as to produce a selective predetermined resistance value by allowing such reoxidation to proceed for a predetermined period of time between stripping the oxide layer and welding.

Further examples of coated sheet metal panels and like articles which can be welded to each other according to the resistance welding process of the present invention are metal-plated sheet metals, i.e. sheet metal panels with metal foils rolled thereon. Such metal foils or foils of metal alloys applied by rolling to the sheet metal panels have melting points which differ from the metals of which the carrier metal sheets consist. On welding, the different melting parameters and other properties of the metallic coatings can cause difficulties. The metallic outer coatings can even be damaged. The welding process according to the present invention has the advantage that no damaging of the outer metallic layers of such metal-clad panels can take place because the current is conducted indirectly through the plane of the metal sheet passed from the one pole to the other pole. If it is desired to conduct the welding current directly through at least one of the metallic coatings, it is frequently of advantage to strip the metallic layer in a geometrical pattern although the metal foils are also electrically conductive because the areas and spots to which the welding electrode is attached and which will be heated during welding may become fluid or may change its color depending upon the type of metal forming the coating and current intensity. Stripping of the metallic coating in a precise, geometrical pattern by milling has the advantage that the stripped area can be limited to a minimum and that the stripped area can be recoated readily and completely by means of a geometrically corresponding coating of the same or other kind of metal whereby the surface is reconstituted.

Furthermore, the welding process according to the present invention can also be used with the advantage to weld to each other rusted oily, or otherwise soiled sheet metal panels and the like articles if a derusting or otherwise cleaning pretreatment is not possible.

The welding process according to the present invention thus is useful for electric resistance welding of sheet metal panels of the like articles which may be composed of the same metal. It is, however, also applicable to sheet metal panels or the like articles which may consists of different metals. Said panels or the like articles can be coated with any type of coating which disadvantageously affects welding or is affected by the welding process. Said process is especially useful in large scale production since it yields predeterminable, uniform, optimum results in a most economical manner.

BRIEF DESCRIPTION OF THE SEVERAL VIEWS OF THE DRAWINGS

Various embodiments of the method according to the present invention and the appliances required for performing the same will now be described by way of example with reference to the accompanying drawings, in which

FIG. 7 is a section of a prepared seam welding for two sheet metal panels, each coated on both sides, separated by wires with indirect current supplies.

FIG. 8 is a perspective illustration of a welding wire having an hour-glass-shaped cross-section.

FIG. 9 is a perspective illustration of a welding wire having a cusped triangular cross-section.

FIG. 10 is a section of a prepared welding spot for a U-shaped folded-over margin and an angled margin engaged therein of two sheet metal panels, respectively, each coated on both sides, with intermediate welding pieces and indirect current supply.

FIG. 11 is a section of a prepared welding spot of two sheet metal panels, each coated on both sides, with an intermediate welding piece and indirect current supply, enclosed between capacitor plates.

FIG. 31 is a plan view of an insulating strip with a welding wire stuck on.

FIG. 32 is a section of a prepared welding spot with a welding device superimposed.

FIG. 33 is a section of a prepared welding spot for a lower sheet metal panel with an intermediate welding piece held by the welding device.

FIG. 35 is a section of a prepared welding spot with a welding pin to be welded in.

FIG. 39 shows a prepared welding zone for welding by the aid of lifter pin of a pin welding appliance.

FIGS. 1a to 5a, FIG. 7a, FIG. 11a, FIG. 14a, FIG. 17a, FIG. 19a, FIG. 20a, FIG. 25a, FIG. 26a, FIG. 27a, FIG. 29a, FIG. 30a, FIGS. 32a to 39a correspond to FIGS. 1 to 5, FIG. 7, FIG. 11, FIG. 14, FIG. 17, FIG. 19, FIG. 20, FIG. 25, FIG. 26, FIG. 27, FIG. 29, FIG. 30 and FIGS. 32 to 39 and differ therefrom by having the preheating and/or welding current supplied and conducted to the sheet metal panels from a stripped area or spot provided at the surface of at least one of the sheet metal panels preferably at an edge portion of said sheet metal panel.

In said FIGS. like index numerals indicate like parts.

DETAILED DESCRIPTION OF THE INVENTION

Figure 1:
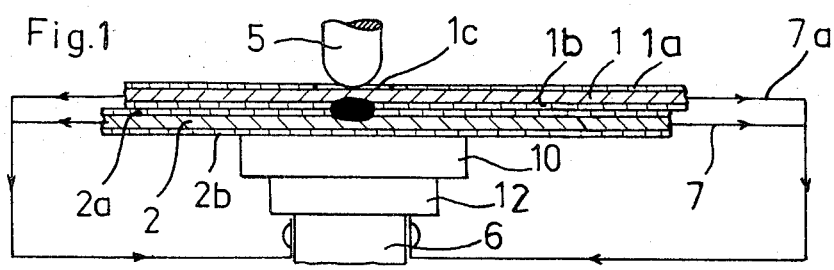
FIG. 1 is a section of a welded spot of two sheet metal panels each coated on both sides, their outer coatings left undamaged, and having two indirect supplies of welding current and a direct one through an electrode.

In FIG. 1 a sheet metal panel is illustrated having an upper coating 1a and a lower coating 1b, which panel is to be welded to a second panel having an upper coating 2a and a lower coating 2b. When welding, one of the outer coatings, namely the lower coating 2b of the panel 2 should remain undamaged. For this purpose the panel 1 has a stripped area 1c at the welding zone, so that an upper electrode 5 comes into contact with the metal sheet of panel 1. The panels 1 and 2 are connected by cables 7a, 7 to a lower counter-electrode 6. The lower coating 2b rests on a cooling plate 10, and the latter rests through an insulator 12 on the flat counter-electrode 6. When switching on the current, the same flows from the upper electrode 5 through the sheet metal 1 and the cable 7a to the counter-electrode 6. Thereby the panel 1 is warmed underneath the upper electrode 5; the two internal coatings 1b, 2a melt; contact is established with the sheet metal 2; current flows through the sheet metal 2 and cable 7 to the counter-electrode and welds the two sheet metal panels to one another under the pressure of the upper electrode. The welding data are so adjusted and the operation is so controlled that the lower decorative coating 2a does not melt. In order that this coating be not affected even during the cooling of the weld spot, it rests on the cooling plate 10, which in turn rests through an insulator 12 on the counter-electrode.

Figure 2:
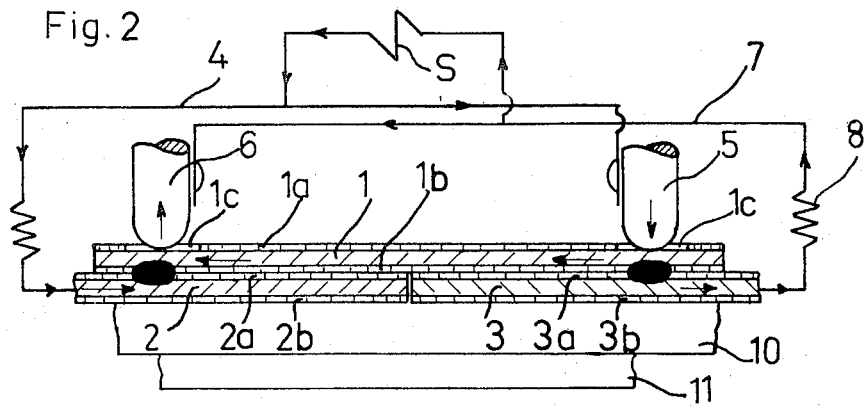
FIG. 2 show two welded spots of three sheet metal panels, each coated on both sides, with two indirect current supplies and two direct supplies of current through two separate electrodes.

FIG. 2 shows a further example, wherein two electrodes are connected in series side-by-side. Thus an upper panel 1 having coatings 1a, 1b can be connected simultaneously to two lower panels 2, 3 having coatings 'a, 2b and 3a, 3b, respectively. The upper panel 1 has stripped zones 1c underneath the right hand side electrode 5 and underneath the left hand side electrode 6. The lower panels rest on a cooling plate 10, which rests on a table 11. From the right hand side electrode 5 a cable 4 leads to the left hand side panel 2, and from the electrode 6 a cable 7 leads to the right hand side panel 3, a regulating resistor 8 being connected in each of these cables. When switching on the current, the same flows from the electrode 5 through the sheet metal 1 to the counter-electrode 6. Thereby the panel is heated at the welding zones; the coatings 1b, 2a and 1b, 3a, respectively, melt; contact is established to the sheet metals 2 and 3. Part of the current then flows from the right hand side electrode 5 through the sheet metal panels 1,3 and the cable 7 to the counter-electrode 6, and through the cable 4, the sheet metal panels 2, 1 to the counter-electrode 6, and welds the two sheet metal panels simultaneously on both spots. The coatings 2b, 3b resting on the cooling plate remain undamaged.

Figure 3:
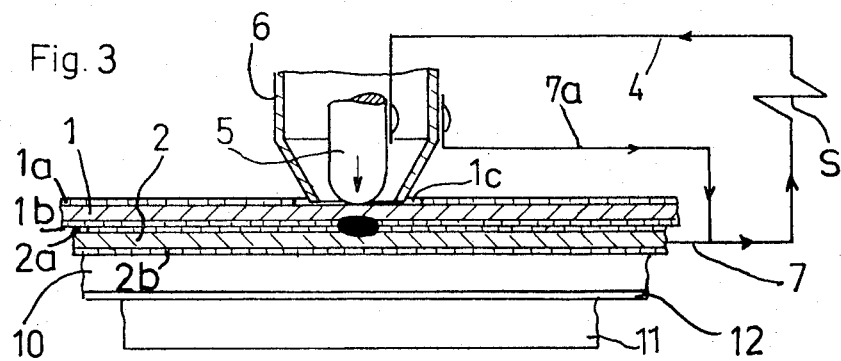
FIG. 3 shows a welded spot of two sheet metal panels each coated on both sides with indirect current supply and a direct supply of current through an inner and an outer electrode.

In accordance with FIG. 3., welding may be performed by means of an annular counter-electrode. An upper panel 1 having coatings 1a, 1b, has a comparatively large stripped area 1c at the welding zone. The lower panel 2 having coatings 2a, 2b rests on a cooling plate 10 which rests through an insulation 12 on a table 11. The inner electrode 5 is surrounded by an outer annular counter-electrode 6. Both electrodes contact the sheet metal 1 within the stripped area 1c. The inner electrode 5 is connected to one pole of a secondary circuit S of the welding plant by a cable 4, and the outer electrode 6 is connected by a cable 7a to the opposite pole of this circuit. When switching on the current the same flows from the inner electrode 5 through the sheet metal 1 to the outer counter-electrode 6; the panel 1 is warmed at the welding zone; the coatings 1b, 2a melt; contact is established between the sheet metals 1 and 2; the current then flows from the electrode 5 through the sheet metals 1,2 and the cable 7 back to the current source; and the two sheet metals are welded to one another. The coating 2b resting on the cooling plate remains undamaged.

Figure 4:
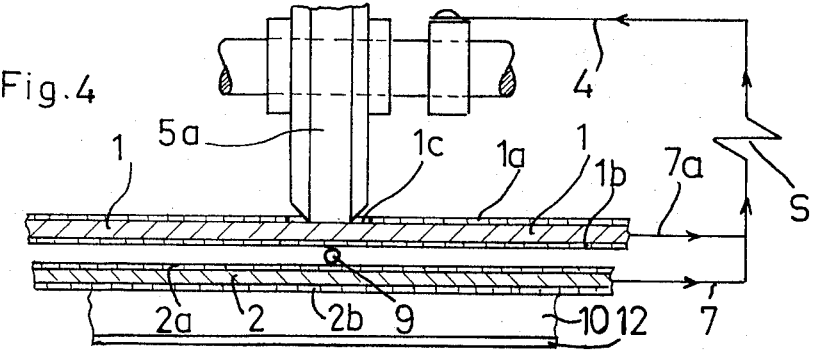
FIG. 4 is a transverse section of a prepared weld seam for two sheet metal panels, each coated on both sides and separated by a welding wire, with indirect current supplies and a direct supply of current through a welding roller.

The method of the present invention is applicable also to roller seam welding. In accordance with FIG. 4 an upper panel 1 having the coatings 1a, 1b is provided with an elongated stripped area 1c. A lower panel 2 having the coatings 2a, 2b rests on a cooling plate 10 and an insulator 12. Between the panels or rather their coatings 1b, 2a a wire 9 is stretched out where the weld seam is to be formed, in order to facilitate the formation of contact. A welding roller 5a is connected by a cable 4 to one pole of the secondary circuit S of a welding plant, the other pole of which is connected by a cable 7 to the sheet metal 1. When switching on the current the same flows through the cable 4, the welding roller 5a and the sheet metal 1 to the cable 7a; the panel 1 is warmed; the coating 1b melts; the wire 9 establishes contact with the sheet metal 1; the coating 2a melts; the wire establishes contact with the sheet metal 2; the current flows through the sheet metal 2 and the cable 7, and welds the wire to the two sheet metals. The coating 2b resting on the cooling plate remains undamaged.

The wire 9 may be alternatively connected to the cable 4, or its ends may be connected with opposite polarity to the cables 4 and 7, respectively.

Figure 5:
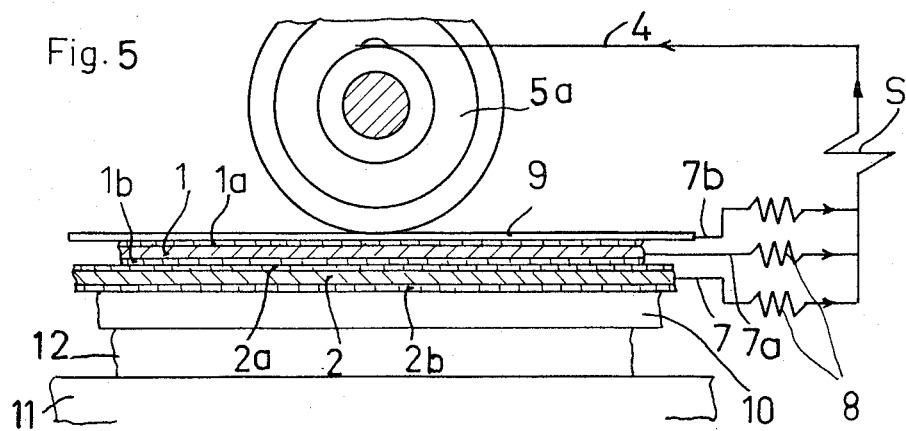
FIG. 5 is a longitudinal section of a prepared weld seam for two sheet metal panels each coated on both sides, with a superimposed welding wire, having indirect current supplies and one direct supply of current through a welding roller.

Welding may even be performed without any stripping 1c. For this purpose an upper panel 1 (FIG. 5) having the coatings 1a, 1b rests directly on a lower panel 2 having the coatings 2a, 2b and resting on a cooling plate 10, which is supported on a table 11 by an insulator 12. A wire 9 is stretched out underneath the welding roller 5a and above the coating 1a. The secondary circuit S of the welding plant has one pole connected by the cable 4 to the welding roller, and the other pole connected by the cable 7 to the sheet metal 2, by the cable 7a to the sheet metal 1, and by a cable 7b to the wire 9. Regulating resistors 8 are connected in the cables 7, 7a, 7b. When switching on the current, the same flows from the welding roller 5a through the wire 9 and cable 7b; the wire 9 is warmed, the layer 1a melts; the wire 9 establishes contact with the sheet metal 1 and the cable 7 and fuses itself, whereby also the coatings 1b, 2a are melted, and welding of the sheet metals 1 and 2 to each other is effected through the cable 7. The coating 2b resting on the cooling plate 10 remains undamaged.

According to a further embodiment of the method of the present invention both outer coatings of the panels may remain undamaged and at the same time a plurality of welding spots may be established simultaneously.

Figure 6:
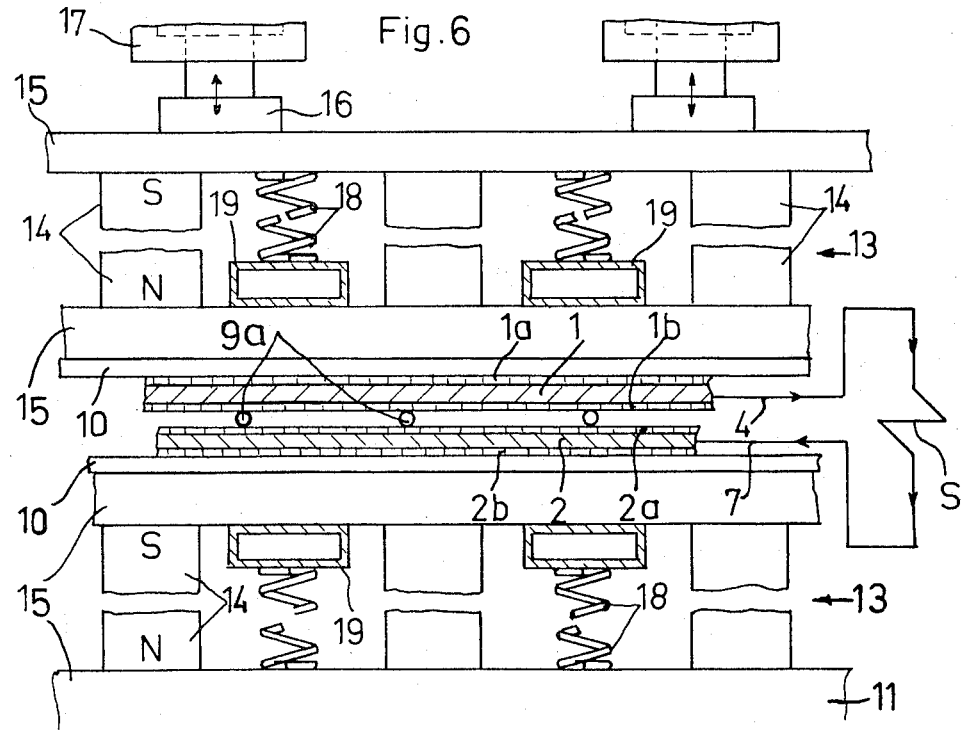
FIG. 6 is a section of a prepared seam welding for two sheet metal panels, each coated on both sides, separated by wires with indirect current supplies, enclosed within a vibrator device.

In accordance with FIG. 6 parallel wires 9a are stretched out between an upper panel 1 having the coatings 1a, 1b and a lower panel 2 having the coatings 2a, 2b. On top of the upper panel 1 and underneath the lower panel 2 cooling plates 10, respectively, are arranged. Each of the cooling plates may be followed by a vibrator device 13 comprising an electro-magnet and a hand- or foot-plate 15 connecting the magnets. For the cooling of the magnet plates 15 contacting the coatings, coolant pipes 19 are provided, which are pressed on the plates 15 by springs 18. The lower vibrator device rests on a table 11. The upper vibrator device can be pressed towards the lower device by the aid of pistons 16 and pneumatic cylinders 17. The secondary circuit S of a welding plant has one pole connected by a cable 7 to the lower sheet metal 2, and the other pole connected by a cable 4 to the upper sheet metal 1. The wires 9a are connected at their respective ends to the poles of the said secondary circuit. For the purpose of welding compressed air is introduced into the cylinders 17, and the alternating current for the magnets 14 is switched on. Vibration of the parts to be welded to each other facilitates penetration of the current through the coatings, and accelerates the welding of the parts by reducing the resistance of transition. When switching on the welding current, the wires 9a are heated, they fuse the adjacent coatings 1b and 2a and establish contact with the sheet metals 1 and 2, to which they are welded under the pressure of the cylinders 17. The two outer coatings 1a and 2b remain undamaged.

FIG. 7 shows a similar arrangement. Underneath an upper vibrator device 13 comprising a magnet plate 15 and a cooling plate 10 lies an upper sheet metal panel 1 with coatings 1a, 1b, and a lower panel 2 with coatings 2a, 2b rests on a lower vibrator device. On top of the coating 2a there lie a series of wires 9a, and under the coating 1b a series of wires 9b, which cross the wires 9a. Instead of the second series of wires a sheet metal 9c covering all the wires 9a may be provided, which on its face contacting the wires may be either blank, or if coated, is stripped on circular or stripe-shaped zones. The wires 9a are connected by a cable 4a to one pole, and the wires 9b or the sheet metal 9c by a cable 7a to the other pole of a secondary circuit S. Moreover, the upper sheet metal 1 is connected to the cable 4, and the sheet metal 2 to the cable 7, i.e. with a polarity opposite to that of the adjacent wires. When switching on the welding current, firstly the wires are fused, starting on the crossing points, then the coatings 1b, 2a along the wires, and finally the sheet metals 1,2 come into contact with, and under the pressure of the plate 15 are welded to each other. The outer coatings 1a, 2b remain undamaged.

Instead of the round cross-section wires illustrated in FIGS. 4 to 7, profiled wires having sharp edges may be used.

For example, FIG. 8 shows a wire having an hour glass-shaped cross section, and FIG. 9 shows a wire having a cusped triangular cross section, FIGS. 8 and 9 being on a larger scale. Circular or stripe-shaped stripped areas may be provided on the welding spots or lines, and intermediate welding pieces in the shape of wires or lengths of wires may be inserted therein.

FIG. 10 shows an example for angularly turned-up sheet metals e.g. of partition walls. One margin of a sheet metal panel 1 with coatings 1a, 1b is folded over under an angle of 180°. Before the folding, stripped zones 1d, 1d' of circular or stripe shape have been provided in the coating 1b at the prospective welding zones. The angularly turned-up margin of a panel 2 having coatings 2a, 2b engages in the bend of panel 1. On the turned up flange stripped zones 2c and 2d, respectively, are provided at the welding zones.

In the upper stripped zones 1d, 2c and in the lower stripped zones 2d, 1d welding pieces 20 in the form of discs, strips or wires are inserted, the thickness of the which for establishing contact exceeds the sum of the thicknesses of two coatings. The bend of the sheeet metal panel 1 rests through a cooling plate 10 on a table 11, while the upper surface of the panel 1 is covered by a further cooling plate 10, and can be pressed down by a presser plate 15, piston 16 and pressure cylinder. The panel 1 is connected by a cable 4 to one pole, and the panel 2 by a cable 7 containing a regulating resistor 8 to the other pole of the secondary circuit of a welding plant. When switching on the current, the sheet metals 1 and 2 are welded to the welding pieces 20. The outer coating 1a of the panel 1 remains undamaged.

A further embodiment of the method for maintaining an outer coating undamaged is illustrated in FIG. 11. A panel 1 with coatings 1a, 1b is to be welded to a panel 2 with coatings 2a, 2b. For this purpose the juxtapositioned coatings 1b and 2a have stripped zones 1d, 2c, into which a welding piece in the form of a wire is inserted. To the outer surfaces of the panels 1, 2 an upper capacitor plate 31a and a lower capacitor plate 31b are applied, the upper one being capable of being pressed down through an insulator 12 by a presser plate 15. The upper capacitor plate is connected to one pole of a direct current source, the lower one to the other pole thereof. Moreover the sheet metal 1 is connected by a cable 4 to one pole, and the sheet metal 2 by a cable 7 to the other pole of a source of welding current, the pole of the upper capacitor plate 31a being of the same polarity as the pole of sheet metal 1, and likewise that of the lower capacitor plate 31b being of that of the sheet metal 2. When the capacitor plates are charged and the welding current is switched on, the electric field of the capacitor plates forces the welding current from the outer layers inward towards the welding point, whereby the welding is accelerated, warming is reduced and kept away from the decorative outer coating. The decorative outer coating remains undamaged even with thin sheet metals and thin coatings.

The capacitor plates may serve at the same time as cooling plates. Their shape may be adapted to a curved row of welding spots or line, and they are capable of being pressed towards each other by pistons and pneumatic cylinders, see FIG. 6. Likewise the vibrator device shown there may be additionally provided.

The method according to the present invention may be carried out also with light metal alloy sheets having oxidised surfaces or with bonderixed steel sheets the outer surfaces of which are to remain undamaged. At the welding zones oxide layers, which would require a temperature of 2000°C for melting, and the bonderized layers are removed by mechanical stripping. Inserts of the same metal or of suitable special alloys are to be inserted into the cavities, which inserts are quickly welded to the blank welding zones while developing little heat.

Figure 12:
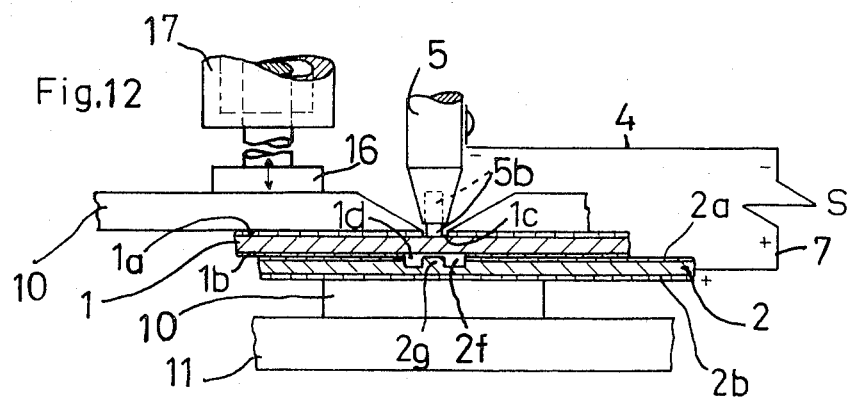
FIG. 12 is a section of a prepared welding spot for two sheet metal panels, each coated on both sides, the lower panel having a milled-out welding pin on its inner surface.

In order to confine the warming of the panels to a small region, to increase the resistance of transition at the welding zone and to make do with short welding periods the contact areas on the welding zone are substantially reduced. According to a first example this can be done simultaneously with the stripping. As exaggeratedly shown in FIG. 12, an upper panel 1 with coatings 1a, 1b is provided on the outer surface with a small stripped zone 1d, and a lower panel 2 with coatings 2a, 2b is provided not only with a stripped zone but moreover with a recess 2f milled out of the sheet metal, which reduces the contact area at the welding zone to a very small welding spot 2g. An annular milling cutter cuts out an annular groove 2f and leaves a cylindrical welding pin 2g standing. The lower panel 2 is supported on a table 11 by a cooling plate 10, while the panel 1 is depressed by means of a piston 16 and pressure cylinder 17, through an upper cooling plate 10 having a cutout for an electrode 5. The electrode 5 having a small tungsten tip 5b is connected to one pole of the secondary circuit of a welding plant, preferably a capacitor welding plant, while the other pole thereof is connected to the sheet metal 2. When switching on the current, the small area of the tungsten tip 5b contacts the sheet metal 1. Under the pressure of the electrode 5 the sheet metal 1 comes into contact with the small welding pin 2g and is welded thereto. The outer coating 2b of the panel 2 remains undamaged, and the outer coating 1a of the panel 1 is to be re-coated on a small area only.

Figure 13:
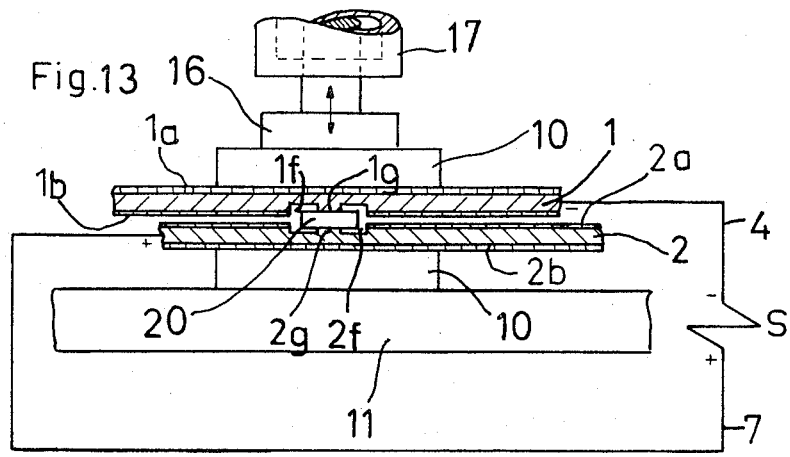
FIG. 13 is a section of a prepared welding spot for two sheet metal panels, each coated on both sides, with milled-out welding pins and an intermediate welding piece interposed between them.

In accordance with a second example shown in FIG. 13 each of the panels 1 with coatings 1a, 1b and the panel 2 with coatings 2a, 2b is to be provided on the inner surface with a stripped zone 1f, 2f, respectively, with the formation of a welding pin 1g, 2g, respectively, and a welding piece 20 is inserted between the welding pins, the thickness of which piece exceeds the sum of the thicknesses of the removed coatings. The lower panel 2 rests on a table 11 through a cooling plate 10, while the upper panel 1 is capable of being pressed down through an upper cooling plate by a piston 16 and pressure cylinder 17. The sheet metal 1 is connected by a cable 4 to one pole of the secondary circuit S of a welding plant, and the sheet metal 2 is connected by a cable 7 to the other pole thereof. When switching-on the current, the same can flow only through the small contact areas of the welding pins 1g, 2g, which are heated quickly and are welded to each other under the pressure of the cylinder 17 while developing little heat. The outer coatings 1a, 2b thus remain undamaged.

Figure 14:
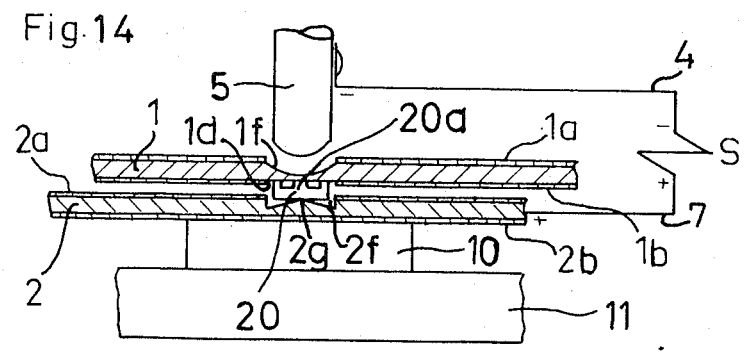
FIG. 14 is a section of a prepared welding spot for two sheet metal panels, each coated on both sides, with milled recesses and an intermediate welding piece.

In accordance with a third example illustrated in FIG. 14 the upper panel 1 with coatings 1a, 1b is provided on top with a trough-shaped milled recess 1f corresponding to the shape of the electrode, and on the under side with a stripped zone 1d, and the panel 2 is provided with a conical milled recess 2f leaving a welding point 2g standing. Between the sheet metals an intermediate welding piece 20 is inserted, which has on top a pin 20a and/or an annular edge for reduction of the contact area. The lower panel 2 rests on a table 11 through a cooling plate 10. An electrode 5 connected by a cable 4 to one pole of a secondary circuit S is pressed down into the milled recess 1f of the upper panel, while the other pole thereof is connected to the sheet metal 2 by a cable 7. When switching-on the current, the same can flow through small contact areas only, which are quickly heated and welded to each other. The coating 2b of the lower panel remains thus undamaged.

Figure 15:
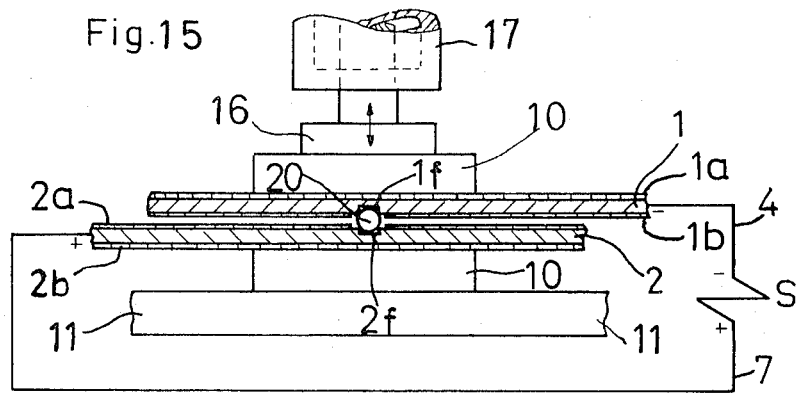
FIG. 15 is a section of a prepared welding spot for two sheet metal panels, each coated on both sides, with milled recesses of rectangular cross-sections and a round intermediate welding piece.

In accordance with a fourth example illustrated in FIG. 15 a panel 1 with coatings 2a, 2b are each provided on their inner surfaces only with a milled recess of rectangular cross-section, 1f, 2f, respectively, and an intermediate welding piece 20 of spherical or wire shape is inserted into the recesses, the diameter of which intermediate piece exceeds the depth of the two milled recesses put together, and has only a point- or line- contact with the bottoms of the milled recesses. The panel 2 rests on a table 11 through a cooling plate 10, while the panel 1 is capable of being pressed down through an upper cooling plate 10 by means of a piston 16 and pressure cylinder 17. The sheet metal 1 is connected by a cable 4 to one pole of a secondary circuit, and the sheet metal 2 is connected by a cable 7 to the other pole thereof. When switching-on the current, the same can flow only through the contact-points or -lines which are heated quickly and are welded to each other. The outer coatings 1a and 2b thus remain undamaged.

Figure 16:
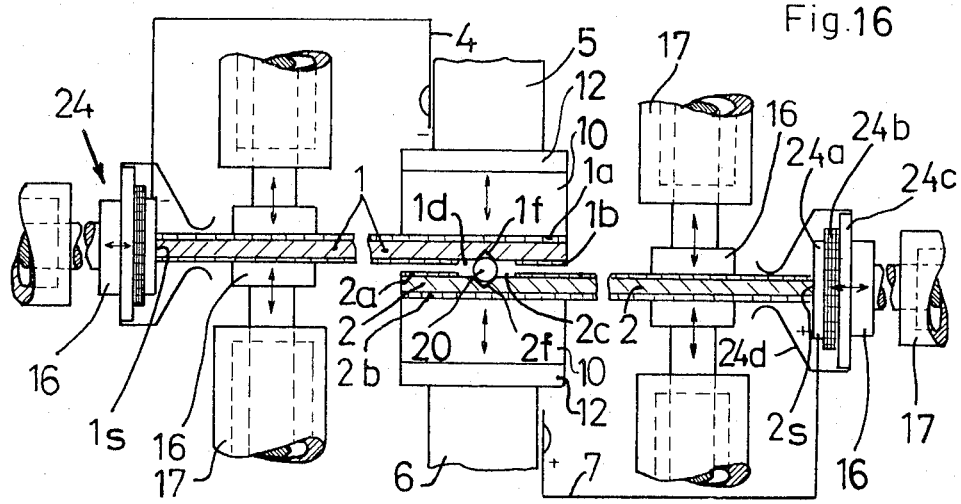
FIG. 16 is a section of a prepared welding spot for two sheet metal panels, each coated on both sides, with milled recesses of triangular cross-sections, a round intermediate piece and a current supply device.

In accordance with a fifth example illustrated in FIG. 16, a panel 1 having coatings 1a, 1b and a panel 2 having coatings 2a, 2b are provided on their inner surfaces with stripe-shaped stripped zones 1d, 2c, respectively, and within these stripped zones with small milled recesses of triangular cross-section 1f, 2f, respectively; into these milled recesses a welding piece 20 in the form of a wire is inserted, the diameter of which exceeds the depths of the said recesses put together. The panel 2 rests at its left hand side end through a cooling plate 10 and an insulator 12 on the lower electrode of a welding plant, while the upper panel 1 overlaps with its right hand side end the lower panel 2 and is capable of being pressed down through an upper cooling plate 10 and an insulator 12 by the upper electrode 5 of a welding plant. The panels 1, 2 are held in position by upper and lower pairs of pistons 16 and pressure cylinders 17, respectively. The electrodes 5, 6 are connected by a cable 4 and 7, respectively to current supply device 24 contacting the outer cut edges 1s, 2s respectively, of the sheet metals. These devices comprise flexible silver-plated copper strips 24a attached to an elongated plate 24c through resilient insulating strips 24b, e.g. of rubber, and can be clamped by holders 24d, e.g. resilient clips, on the margins of the panels 1,2 respectively. The plates 24c are capable of being pressed by pistons 16 and pressure cylinders 17 against the edges of the panels 1,2, respectively. The length of the device depends on the current intensity to be transmitted. When switching-on the current, the same flows through the cables 4, 7 into the sheet metals 1,2 respectively, and through their contact lines with the welding piece, which are quickly heated and welded. The outer coatings 1a, 2b thus remain undamaged.

According to a modification, the coating 1a at the dimple 1l and/or the coating 2a of the welding zone underneath may be previously removed.

Figure 17:
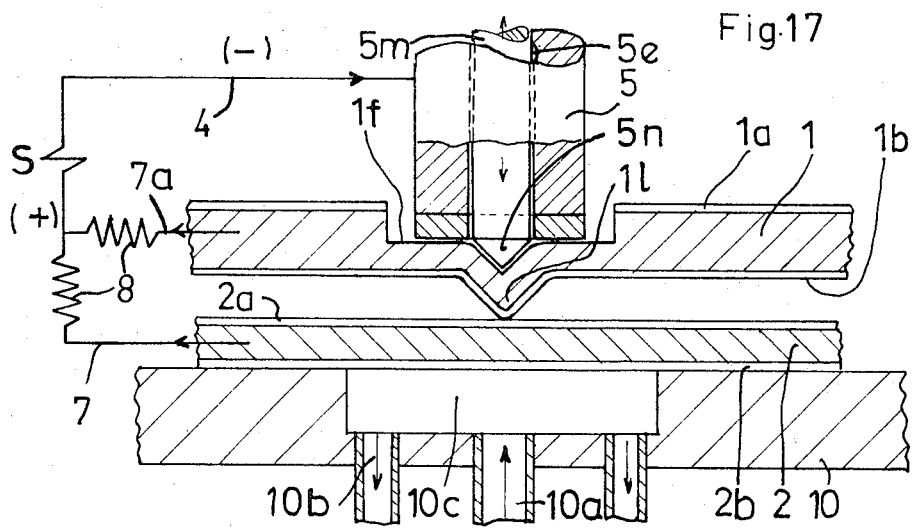
FIG. 17 is a section of a prepared welding spot for two sheet metal panels, each coated on both sides, the upper panel having an external milled recess and a downwardly directed point, and the lower panel being cooled at the welding zone.

A further example of welding with little development of heat in the lower decorative panel is illustrated in FIG. 17. An upper holder panel 1 with coatings 1a, 1b has on top a milled recess 1f reducing the thickness of the sheet metal. In the middle of the milled recess a downwardly pointed dimple 1l is provided which is produced by the tip of an electrode or by a punch in a separate operation. A lower panel 2 with coatings 2a, 2b rests on a cooling plate 10 having a recess 10c underneath the welding spot. Coolant supply-and-drain pipes 10a and 10b, respectively, issue into said recess, whereby even a slight warming of the outer coating 2b is prevented which might cause a slightly lustrous spot thereon. An electrode 5 having a bore 5e engages in the milled recess 1f, in which bore a spring-loaded electrode pin 5m is mounted, having a tip 5n for the dimple 1l. The electrode 5 and electrode pin 5m are connected by a cable 4 to one pole of the secondary circuit S of a welding plant, the other pole of which is connected by a cable 7a through a regulating resistor 8 to the sheet metal 1 and by a cable 7 through a further regulating resistor 8 to the sheet metal 2. When switching-on the current, the same flows via the electrode 5 and the sheet metal 1, whereby the latter is warmed at the thinned region at the milled recess; the coating 1b and subsequently the coating 2a melt. The dimple 1l comes into contact with the sheet metal 2; current flows then also through the sheet metal 2 and welds the sheet metal 2 to the sheet metal 1 under the pressure of the electrode 5. The tip 5n of the spring-loaded electrode pin 5m is thus pushed into the electrode 5 so that a weld blob is formed with little warming of the decorative panel. The outer coating 2b thus remains undamaged.

Further reduction of the heating of the coated panels is possible by making the welding pieces of a material, the melting point of which is below the melting point of the sheet metals to be connected. For steel sheet the usual hard and soft solders, and for aluminium sheet, aluminium alloys are in consideration which have a low melting point.

Figure 18:
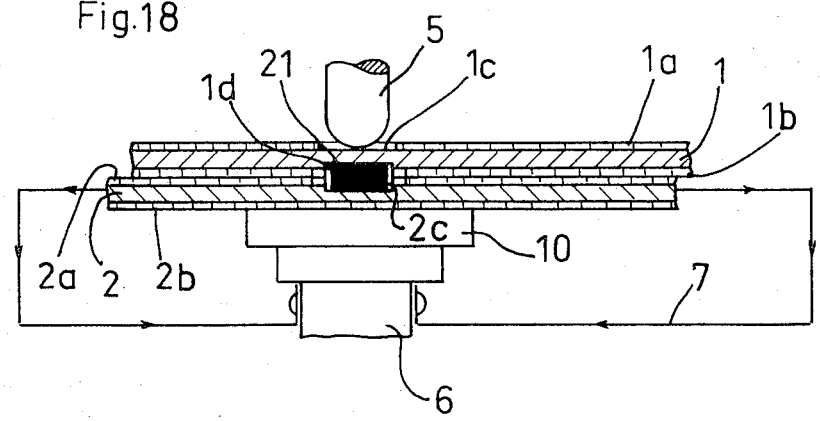
FIG. 18 is a section of a prepared welding spot for two sheet metal panels, each coated on both sides, with a low melting point intermediate welding piece.

In accordance with FIG. 18 an upper panel 1 with coatings 1a, 1b is provided with a stripped zone 1c on top and a stripped zone 1d on its underside, and a lower panel 2 with coatings 2a, 2b is provided with a stripped zone 2c on top, these stripped zones having the shape of circles or strips. In the cavity formed by the inner stripped zones there is inserted an intermediate piece 21 in the form of a disc or strip and of a material the melting point of which is lower than that of the sheet metals 1,2. The lower panel 2 rests through a cooling plate 10, e.g. of copper, on an electrode 6. An upper electrode 5 engages in the stripped zone 1c of the upper panel. The lower sheet metal is connected by a cable 7 to the lower electrode 6. When switching-on the current, the intermediate piece 21 melts and connects itself to the sheet metals, whereafter the current is switched off before the melting point of the sheet metals is reached. The outer coating 2b of the lower panel thus remains undamaged.

Figure 19:
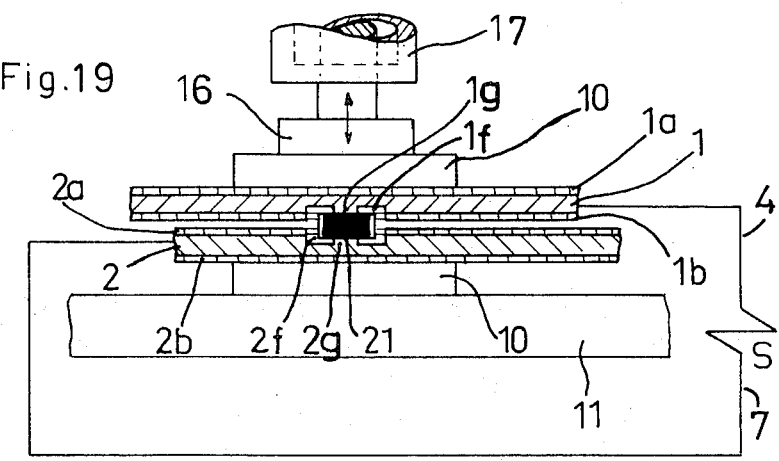
FIG. 19 is a modification of FIG. 18 with milled out welding pins.

In accordance with FIG. 19 the warming of the sheet metals is reduced and the resistance of a transition at the contact areas is increased. For this purpose the panel 1 with coatings 1a, 1b and the panel 2 with coatings 2a, 2b are provided at their inner surfaces with milled recesses, 1f, 2f, respectively, leaving small welding pins 1b, 2g respectively, standing in their centres. The milled recesses are annular for spot welding, and in the shape of grooves for seam welding. Between the welding pins intermediate pieces 21 are inserted, the melting point of which lies below that of the sheet metals and to which flux is added. The lower panel 2 rests on a table 11 through a cooling plate 10. The upper panel 1 is capable of being pressed down through a cooling plate 10 by a piston 16 and pressure cylinder 17. The upper sheet metal 1 is connected by a cable 4 to one pole of a secondary circuit S, and the panel 2 is connected by a cable 7 to the other pole thereof. When switching-on the current, the same flows through the sheet metal 1 and the small welding pins 1g, 2g into the sheet metal 2, whereby the intermediate piece melts quickly and connection is established by the pressure of the piston, before the sheet metals reach their melting point. The outer coatings 1a, 2b thus remain undamaged.

Further reduction of the duration of the welding period and hence of the warming of the sheet metal panels is attainable by the use of a capacitor pulse welding plant. For the generation of small electric arcs between the juxtapositioned stripped sheet metal surfaces the latter must have a predetermined small spacing or only very small contact-spots or -points with each other.

Figure 20:
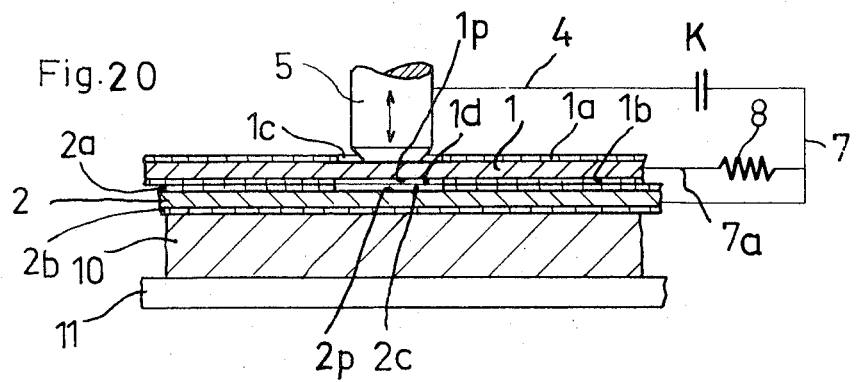
FIG. 20 is a section of a prepared welding spot for the two sheet metal panels, each coated on both sides, with internal stripping for arc welding.

The cavity formed by the stripping and having a height of fractions of a millimetre allows the formation of small electric arcs. In the embodiment illustrated in FIG. 20 an upper panel 1 with coatings 1a, 1b is provided on top and on the underside with stripped zones 1c, 1d, respectively, and a lower panel 2 having coatings 2a, 2b is provided on top with a stripped zone 2c, so that the blank sheet metal surfaces 1p and 2p are juxtapositioned with a narrow gap. The lower panel rests on a table 11, through a cooling plate 10, while the upper panel is subject to the pressure of an electrode 5. This electrode is connected by a cable 4 to one pole of a capacitor pulse welding plant K, the other pole of which is connected by a cable 7 to the sheet metal 2 and by a cable 7a through a regulating resistor 8 to the sheet metal 1 for additional warming. When switching-on a current of sufficient voltage, electric arcs are formed between the blank surfaces 1p, 2p of the sheet metals, whereby these surfaces are superficially fused without thermal effect in depth. In the meantime the upper sheet metal surface 1p has been pressed against the lower sheet metal surface 2p to which it is welded in the final phase. These operations occur in periods of the duration of milliseconds. The outer coating 2b of the panel 2 thus remains undamaged.

The welding current pulse requires a sufficient initial voltage in order to initiate the formation of an electric arc and to sustain the latter. For metering the optimum welding energy required, the capacitor battery has a capacity variable by suitable switching (energy selector).

In the case of a capacitor pulse welding machine with transformed capacitor discharge, the secondary circuit of the pulse transformer, between the poles of which the welding zone is connected, is to be constructed with sufficient voltage for initiating and sustaining the electric arcs.

As capacitor welding machines for the resistance-arc welding method those are also suitable in which the capacitor output is not transformed, and which comprise long cables of the welding appliance and a very bulky welding circuit. Since with such discharge current pulses the total welding period lasts only substantially one millisecond, the depth of penetration of the heat is very small. Accordingly the obverse decorative coating of the workpiece is not affected if the thickness of the sheet metal is from 0.5 mm upward. The working life of the electrodes is then practically almost unlimited. Welding is independent of the thickness of the sheet metal.

The welding parameters, i.e. the voltage as well as welding period may be set permanently. Depending on the actual conditions and on the sort of sheet metal panels to be welded to each other, the current intensity has to be varied. This is done by connecting or disconnecting capacitor units of the capacitor battery and of the welding energy selectors. The electric arc welding within the cavities according to the present invention likewise requires certain definite minimum magnitudes of energy for the welding and for the sufficient superficial melting of the juxtapositioned blank surfaces and for the melting of any inserted welding pieces.

Since the energy transformation is concentrated in the space of the electric welding arc, the loss of energy due to thermal conduction is low as compared with resistance welding. Welding is accordingly effected with a substantially lower requirement in energy as in a corresponding case of resistance welding. Consequently the decorative coating remains undamaged provided the welding parameters, the inserted pieces, or the like are correctly dimensioned.

Between the minimum magnitude of energy required for welding and the maximum magnitude permissible without damaging the decorative coating there are close tolerances.

Likewise, the pressure of the electrodes or of a presser means, which does not carry a current, are of importance for the welding, when the capacitor welding current is supplied to the welding spot, e.g. through a cut edge or elesewhere through a stripped area of the sheet metal to be welded. The resistance of transition between the two sheet metals to be welded to one another must not then be reduced so far that a current flows by contact rather than as an electric welding arc. Also the shape of the effective electrode surface or presser means may be of importance.

It is necessary to make the stripper welding zones juxtapositioned to each other in the cavity approach one another with a progressively diminishing spacing by pressure, e.g. by spring bias, until sufficient superficial melting by the electric arcs is achieved; this progressive approach is corresponding to the progress of the superficial melting. Substantially on termination of the welding current after a predetermined welding period, when attaining a fused surface condition of the welding areas, the latter are then united by being pressed on each other. The time lag required for this purpose may be produced in various ways. By means of inserts, such as wire lengths crossing each other or of fine wire mesh, this delay may be extended up to the complete fusion of such inserts, in synchronism with the moment of optimum superficial melting of the blank sheet metal surfaces to the electric arcs. This is done while applying an appropriate pressure through electrodes or presser means by means of compressed air and additional spring-mounting of the electrodes.

Figure 21:
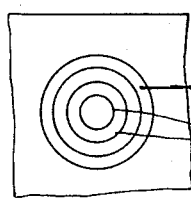
FIG. 21 is a plan view of a stripped zone with circular ribs.
Figure 22:
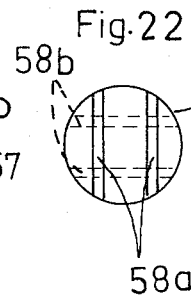
FIG. 22 shows an intermediate welding disc having ribs on both sides.
Figure 23:
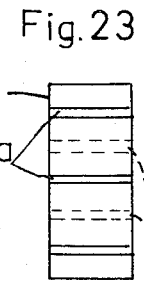
FIG. 23 shows an intermediate welding strip having ribs on both sides.
Figure 24:
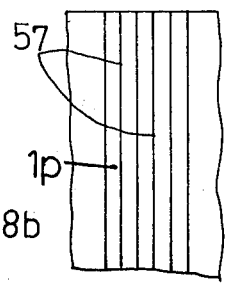
FIG. 24 shows an elongated stripped zone with ribs.

Formation of electric arcs is promoted by the provision of ribs 57 on the stripped blank sheet metal surfaces 1p, 2p. In FIG. 21 circular ribs are shown for spot-welding, and in FIG. 24 longitudinal ribs on the sheet metal surface 1p are shown for seam welding, said ribs bring produced by profiled milling cutters when stripping off the coatings. For comparatively large spacings between the sheet metal surfaces 1p, 2p, intermediate welding pieces 58 may be inserted for establishing the correct spacing, which pieces may have the shape of discs as in FIG. 22 or of strips as in FIG. 23, and have ribs 58a on the front and ribs 58b on the back.

Figure 25:
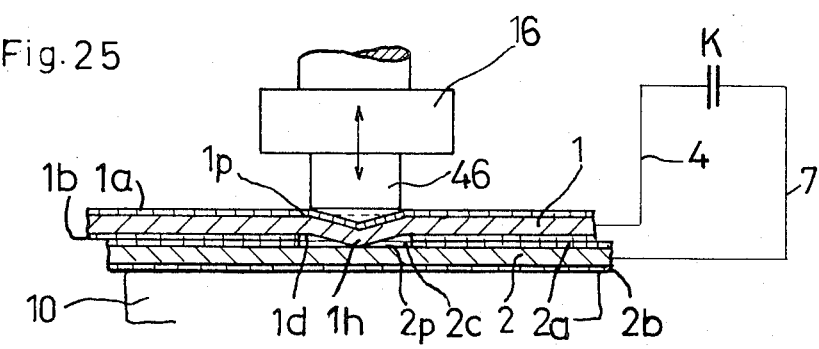
FIG. 25 is a cross-section of a prepared welding spot with a downwardly pointed embossed dimple underneath the electrode.

For sheet metal panels having comparatively thick coatings the gaps between the blank sheet metal surfaces to be welded to each other are to be reduced or bridged by means of pointed embossings. In FIG. 25 an upper panel 1 with the coatings 1a, 1b is provided on its underside with a stripped zone 1d, and a lower panel 2 with the coatings 2a, 2b is provided on top with a stripped zone 2c. The lower panel rests on a cooling plate 10. Above the upper panel a pointed punch 46 is arranged at the welding zone, which punch may be impressed into the panel 1 by a resilient presser means, e.g. a spring or by the piston 16 of a pressure cylinder so that a pointed dimple 1h is embossed in the panel 1 and contact is established between the blank sheet metal surfaces 1p, 2p. The upper sheet metal 1 is connected by a cable 4 to one pole of a capacitor pulse welding plant K, and the lower sheet metal 2 is connected by a cable 7 to the other pole thereof. When switching-on the current, electric arcs are formed. After superficial melting of the surfaces 1p, 2p the same are welded to each other under the pressure of the punch 46. The outer coatings 1a, 2a thus remain undamaged.

For spot welding the cross-section of the punch 46 is circular, for seam welding strip-shaped.

Figure 26:
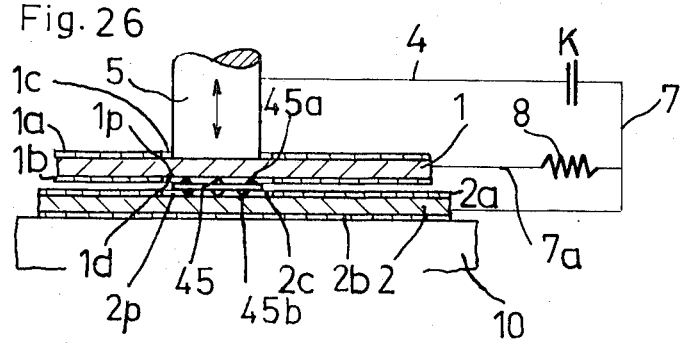
FIG. 26 shows a prepared welding spot with an intermediate welding piece having points directed upwardly and downwardly.
Figure 27:
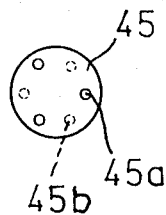
FIG. 27, is a plan view of the welding piece of FIG. 26.

In FIG. 26 contact is established by means of intermediate welding pieces provided with points. An upper panel 1 with coatings 1a, 1b is provided with a stripped zone 1c on top and on its underside with a stripped zone 1d, and a lower panel 2 with coatings 2a 2b is provided with a stripped zone 2c on top. Between the blank sheet metal surfaces 1p, 2p an intermediate welding piece 45 is inserted, which e.g. in FIG. 27 consists in a disc 45 having points 45a, 45b alternately embossed upwardly and downwardly. The panel 2 rests on a cooling plate 10, while the panel 1 can be pressed down by an electrode 5. This electrode is connected by a cable 4 to one pole of a capacitor pulse welding plant K, the other pole of which is connected by a cable 7 to the sheet metal 2 and by a cable 7a through a regulating resistor 8 to the sheet metal 1. The sheet metal 1 is spaced from the sheet metal 2. When switching-on the current electric arcs are formed between the sheet metal surfaces 1p, 2p which are then welded to the intermediate piece by the pressure of the electrode. The outer coating 2b remains undamaged.

Figure 28:
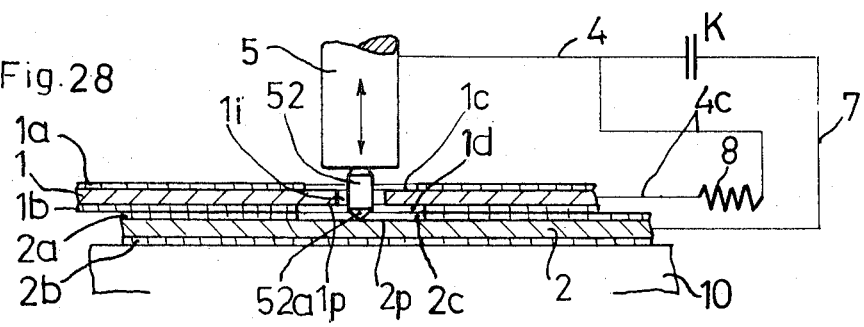
FIG. 28 shows a prepared welding spot with a welding pin inserted.

A further kind of contact formation, by the use of a welding pin, is shown in FIG. 28. An upper panel 1 with coatings 1a, 1b has on top a stripped zone 1c, on its underside a stripped zone 1d, and in the middle of the latter a bore 1i. A lower panel 2 with the coatings 2a, 2b is provided on top with a stripped zone 2c. In the bore 1c a pointed welding pin 52 is inserted. Its diameter of about 1 mm corresponds to the diameter of the hole, and its upper end projects beyond the panel 1 towards the electrode 5. One pole of a capacitor pulse welding plant K is connected by a cable 4 to the electrode 5, and by a cable 4c through a regulating resistor 8 to the sheet metal 1, while its other pole is connected by a cable 7 to the sheet metal 2 which rests on a cooling plate 10. When switching-on the current by the contact of the pointed welding pin 52 with the opposite blank surface 2p electric arcs are ignited between the blank sheet metal surfaces 1p, 2p in the cavity formed by the stripping; the blank sheet metal surfaces are brought to welding temperature and are welded to the fused welding pin 52 and to each other under the pressure of the electrode. The outer coating 2b of the panel 2 thus remains undamaged.

Figure 29:
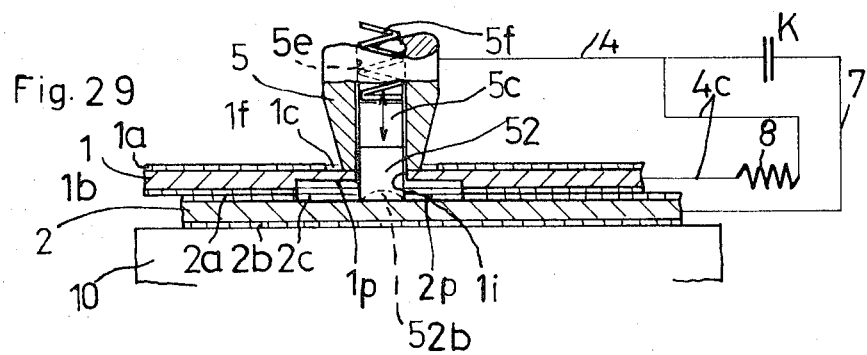
FIG. 29 shows a modification of FIG. 28. with a wedling pin capable of being advanced.

A modification with an enlarged welding zone is illustrated in FIG. 29. An upper panel 1 with the coatings 1a, 1b is provided on top with a stripped zone 1c, on its underside with a larger milled zone 1f and in the middle of the stripped zones with a bore 1i. A lower panel 2 with the coatings, 2a, 2b has a large stripped zone 2c on top, and rests on a cooling plate 10. The electrode 5 has a blind bore 5e, in which there are inserted a spring 5f, a pusher pin 5c and a cylindrical welding pin 52, the underside of which has a cavity producing an annular edge 52b. One pole of a capacitor pulse welding plant K is connected by a cable 4 to the electrode 5, and by a cable 4c through a regulating resistor 8 to the sheet metal 1, while its other pole is connected by a cable 7 to the sheet metal 2. When switching-on the current, electric arcs are ignited by the annular edge of the welding pin 52 between the blank sheet metal surfaces 1p, 2p connected to opposite poles; the surfaces thereof are heated to welding temperature while the welding pin is fused from below, the melt being forced by the pressure of the spring 5f and the pusher pin 5c into the cavity and being welded there to the two blank sheet metal surfaces. The outer coating 2b thus remains undamaged.

Figure 30:
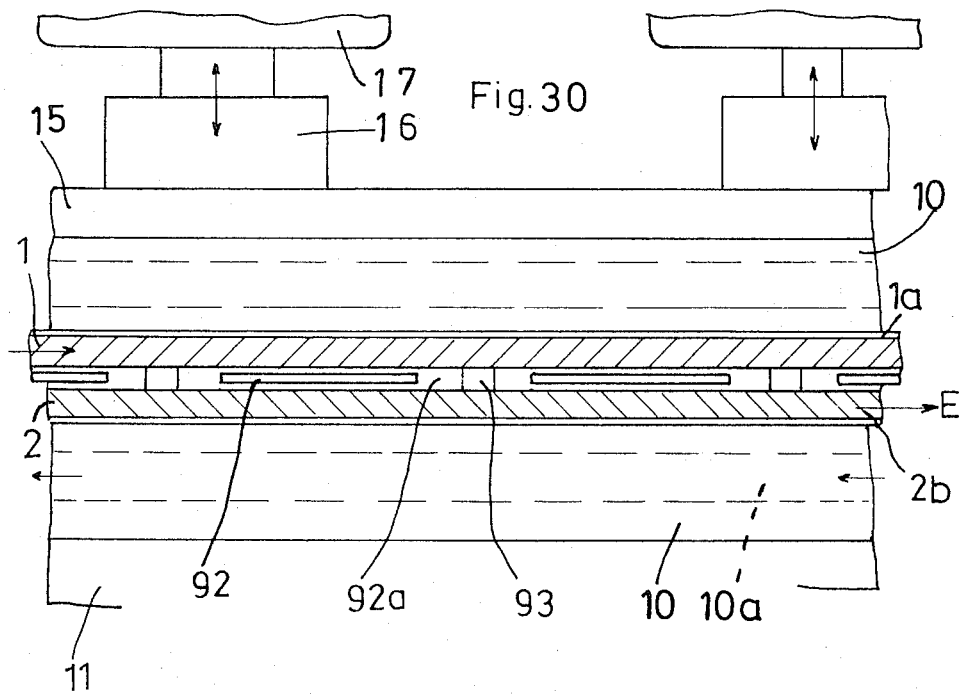
FIG. 30 is a section of a prepared welding zone for two sheet metal panels, each coated on one side, with an insulating insert layer and intermediate welding pieces.

A further example in accordance with FIG. 30 illustrates the welding of coated metals of low electric resistance such as aluminium, brass or copper. Such sheets are usually coated on their outer surface only, since the blank inner surfaces are not corroded. An upper panel 1 having an outer coating 1a is to be welded to a lower panel 2 having an outer coating 2b. For this purpose an insulating insert 92 of paper or synthetic material having cut-outs 92a is placed between the blank inner surfaces of the two panels. Lengths of wire 93 of high electric resistance, e.g. fo steel, which have a diameter of about 0.7 mm and a length of 1 to 5 mm are inserted into these cut-outs. The lower panel rests on a table 11 through a cooling plate 10 with coolant pipes 10a. On top of the panel 1 a cooling plate 10 and on top of the latter a presser plate 15 are placed, which can be pressed down by pistons 16 and pressure cylinders 17. The sheet metal 1 is connected to a source of a welding current, and the panel 2 is earthed. When switching-on the current, electric arcs are ignited within the cut-outs of the insulating insert by the short lengths of wire having high electrical resistance, and these wires are welded to the blank surfaces under the pressure of said cylinders. The outer layers 1a, 2b thus remain undamaged. In this manner it is possible to connect coated aluminium sheet panels by invisible internal welding.

Figure 31:
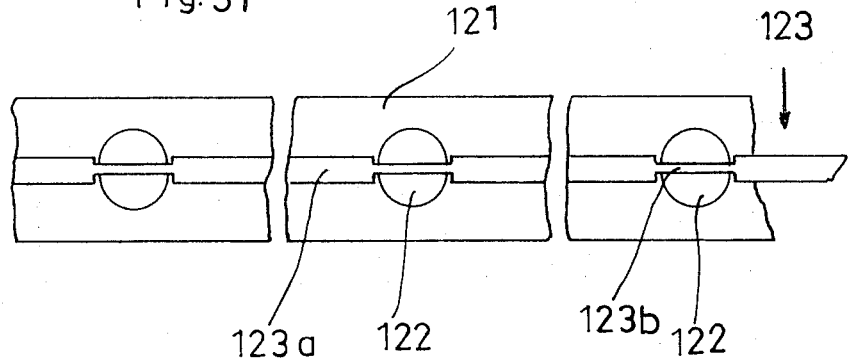

Instead of an insulating insert having cut-outs and of inserted intermediate welding pieces, insulating strips with wires may be used for more economical working of the method: In FIG. 31 an insulating strip 121 has holes 122. A wire 123 provided with flats 123a outside the welding zones and struck on the insulating strip serves as the intermediate welding piece so that the undeformed portions 123b of the wire are juxtapositioned with the said holes and to ignite electric arcs there. In this way the insertion of individual intermediate welding pieces in dispensed with.

Figure 32A:
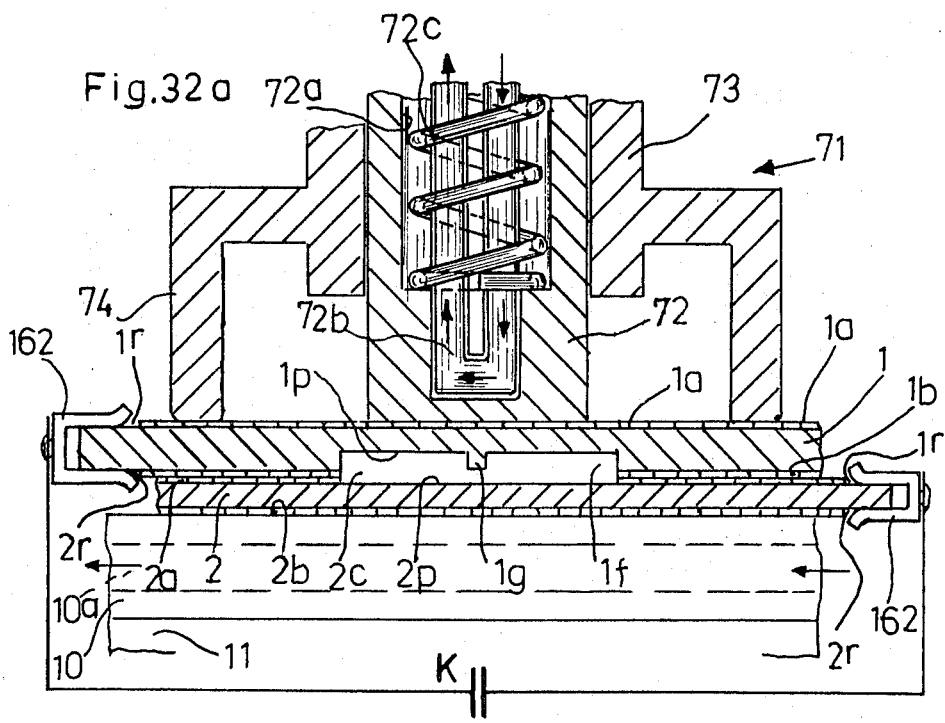
Figure 35A:
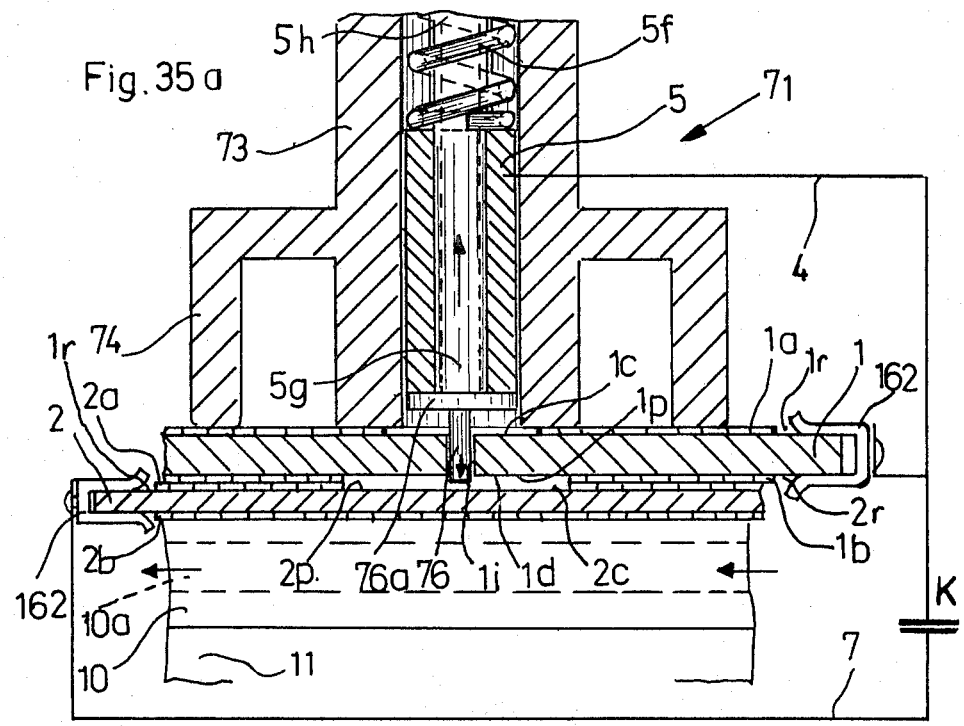
Figure 36A:
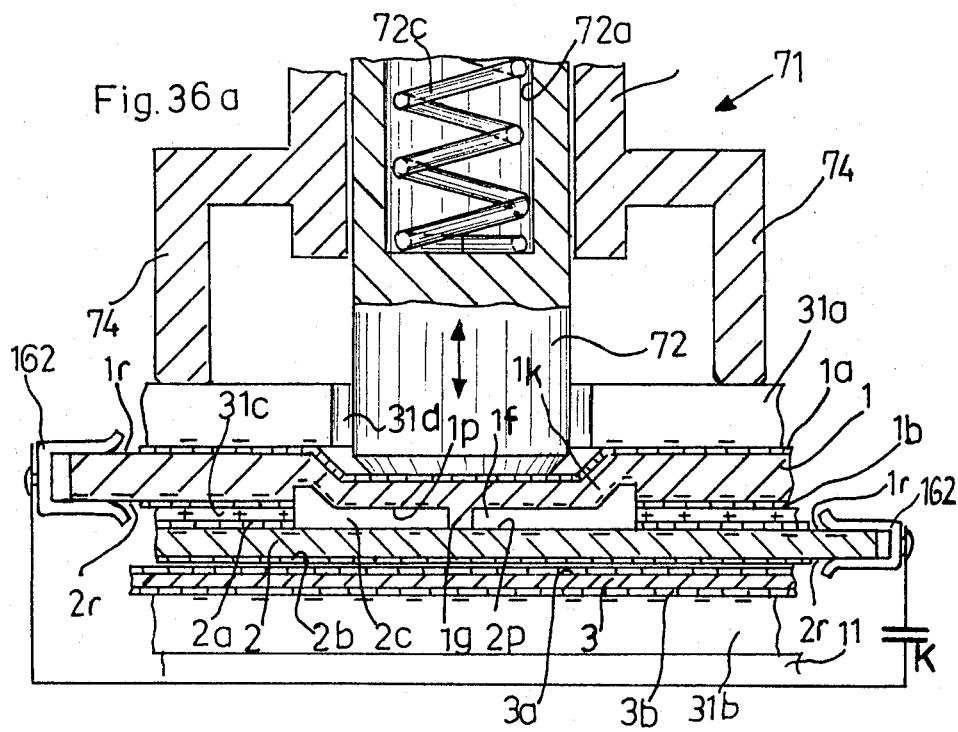
Figure 37A:
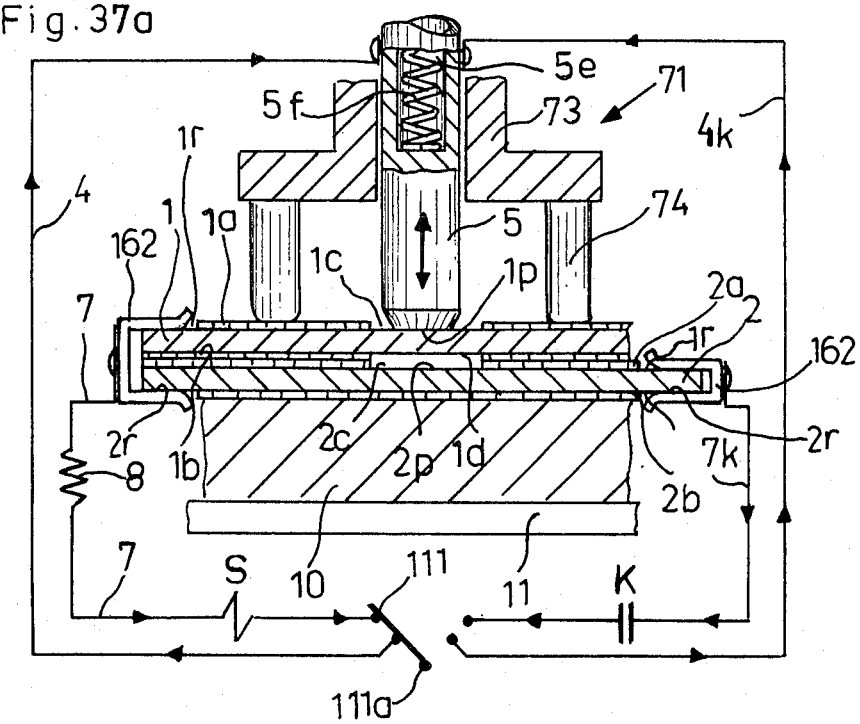

The internal welding of sheet metal panels coated on both surfaces can also be carried out with the use of welding — or presser punch — appliances. For better illustration the following examples are shown on a greatly enlarged scale. In the first example of FIG. 32 an upper panel 1 with the coatings 1a, 1b has a milled recess 1f on its underside, leaving a pin 1g standing in the middle of the recess, and a lower panel 2 has on top a stripped area 2c of equal size as said recess. The lower panel rests on a table 11 through a cooling plate 10 with coolant pipes 10a. Above the upper panel a presser punch 72 of a welding appliance 71 is arranged which punch is guided perpendicular to the surface of the panel by an insulating tube 73 resting with a tripod 74 on the panel 1. The presser punch has a central bore 72a, into which coolant pipes 72b and a compression spring 72c are inserted from above. The presser punch is kept under the bias of said spring at regulable spacing of substantially 3 mm above the panel 1. This panel 1 is connected to a source of welding current, while the plane 2 is earthed at E. For the welding a discharge current is conducted into the sheet metal 1 to be welded, which at that moment has no contact with the decorative panel 2. By the impact from outside of the presser punch, which does not carry current, on the welding zone, the pin 1g of the sheet metal 1 is made to approach the blank area 2p whereby arc welding and fusion of the contact pin g are initiated. By appropriately dimensioned pressure of the spring the sheet metal 1 is brought in area contact of its superficially fused underside with the likewise superficially fused welding zone of the sheet metal 2 and is thereby connected to it by welding. The outer coatings thus remain undamaged and the outer decorative coating 2b of the panel 2 remains also plane, while the holder panel 1 has a depression in its outer surface 1a.

Instead of cylindrical pins 1g line-shaped webs of substantially the same height and thickness as the pins may be provided for seam welds made, e.g. by means of capacitor discharge currents forming electric arcs, siad webs being left standing when milling out recesses on the stripped juxtapositioned surfaces by means of side milling cutters.

Figure 34:
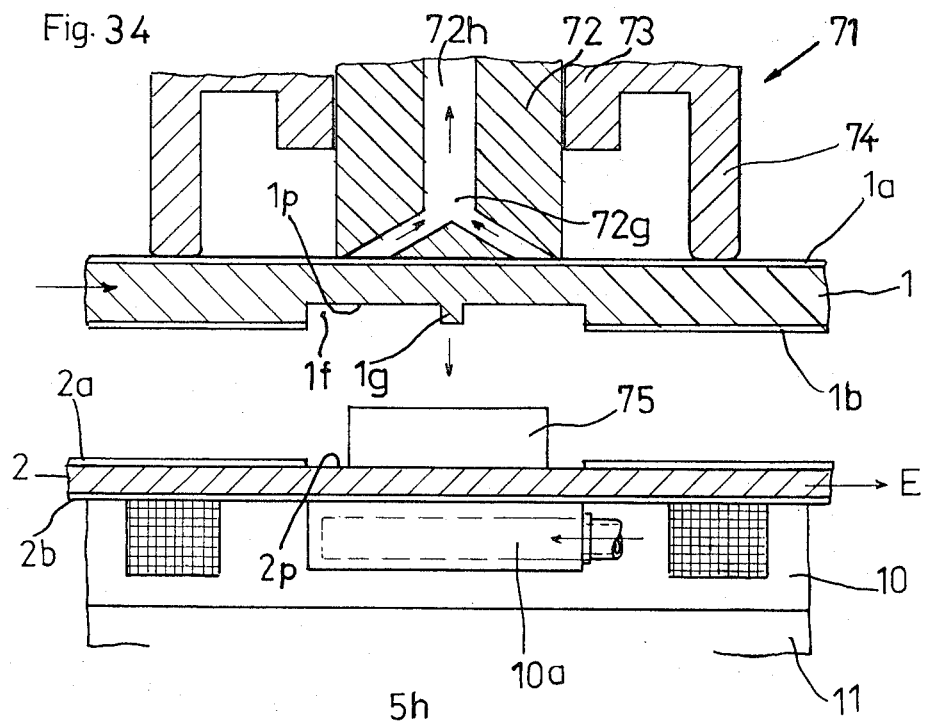
FIG. 34 is a similar section with an upper sheet metal panel to be welded to the intermediate welding piece.

A further example with the use of an intermediate welding piece is shown in FIGS. 33, 34. A lower panel 2 with coatings 2a, 2b, has on top a stripped zone 2c with a blank metal area 2p, and rests on a table 11 through a cooling plate 10 having bores 10a for a liquid coolant. Above the stripped zone 2c the electrode 5 of a welding appliance is guided in an insulating tube 73 perpendicular to the surface of the panel, said tube being supported by a tripod 74. The electrode 5 has a central bore 5e for a compression spring 5f and a holder means 5g for an intermediate welding piece 75 to be inserted into the foot of the electrode. The holder means illustrated comprises a suction air pipe 5h which issues in the electrode foot. When using magnetic intermediate welding pieces 75 an electromagnet may be inserted instead of the air suction pipe. The intermediate welding piece has a diameter somewhat smaller than the thickness of the stripped zone 2c and a height of substantially twice the thickness of the sheet metal. On its under surface the intermediate welding piece has a small pin 75g which prior to welding is kept at a regulable spacing from the blank sheet metal surface 2p and is preloaded by the spring 5f. The intermediate welding piece is connected through the electrode 5 to the source of welding current, and the sheet metal 2 is earthed at E. When switching on the welding current, the electrode previously held by a solenoid coil is released, jerks the intermediate welding piece against the blank sheet metal surface 2p and is welded to the same.

In a further operation of panel 1 with the coatings 1a, 1b and a milled recess 1f on its underside, wherein a welding pin 1g is left standing, is brought on top of the welding piece previously welded to the sheet metal 2, and is held at a small distance from that sheet metal 2 by a welding device 71. For this purpose the presser punch 72, which does not carry current, comprises a holder means 72g, e.g. with a suction air pipe 72h, and is guided in an insulating tube 73 mounted on a tripod 74. The sheet metal 1 is connected to the source of welding current, and the intermediate welding piece 75 is connected through the sheet metal 2 to Earth E. When switching on the welding current, the presser punch is released and jerks the sheet metal 1 with its welding pin 1g against the intermediate welding piece, and welds it to the same.

Figure 35:
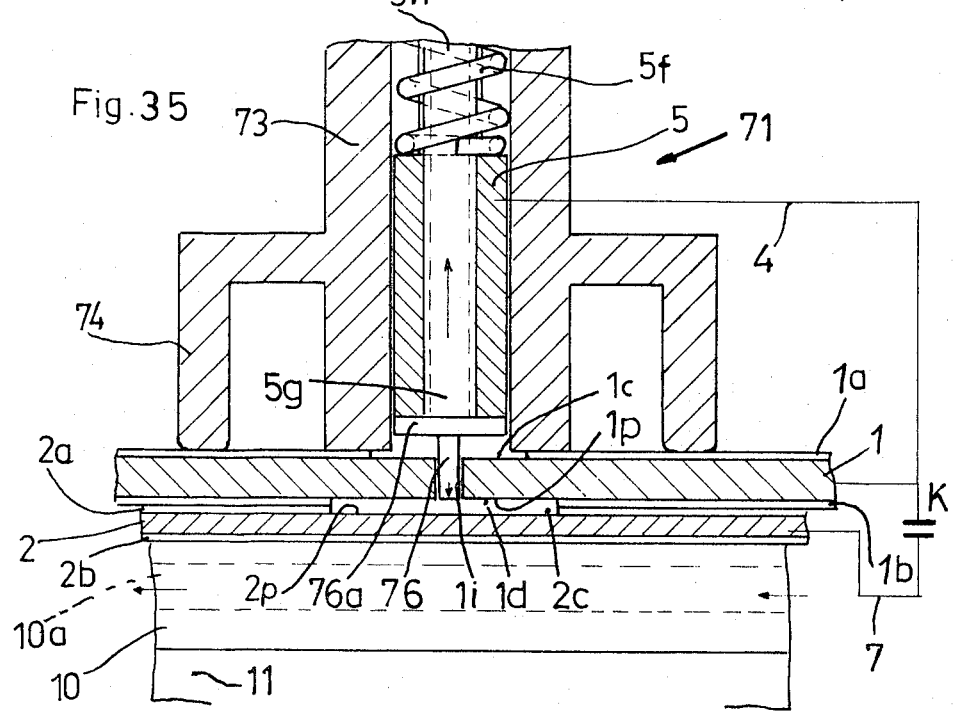

A modification for simpler treatment of a welding pin is shown in FIG. 35. An upper panel 1 with the coatings 1a, 1b has on top a stripped zone 1c, on the underside a stripped zone 1d and in the middle thereof a bore 1i. A lower panel 2 with the coatings 2a, 2b is provided with a stripped zone 2c on top, and rests on a table 11 through a cooling plate 10 with coolant pipes 10a. A welding device 71 is put on top of the panel 1, which device comprises an electrode 5, an insulating guide tube 73 and a tripod 74. The electrode is subject to the bias of a spring 5f and is provided on its underside with a holder means 5g for a welding pin 76. The holder means consists in FIG. 35, e.g. of an air suction pipe 5h. The welding pin has a flange 76a on top, and fits into the bore 1i of the sheet metal 1. Its length corresponds at least to the thickness of the sheet metal plus the thickness of the coatings 1b and 2a. One pole of a capacitor pulse welding plant K is connected by a cable 7 to the sheet metal 2. When switching on the welding current, the electrode 5 is released and jerks the welding pin 76 against the blank sheet metal zone 2p, ignites the electric arcs between the blank sheet metal areas 1p and 2p, and welds the same to each other. The outer coating of the panel 2 thus remains undamaged.

The pin may have been arranged on top of the sheet metal with an air gap, and the electrode may have been preloaded, so that said pin originally does not contact the decorative panel and comes into contact with it only by the resilient jerking forward of the electrode, when switching on the capacitor current, thus effecting the formation of th electric arcs.

The welding pin 76 having the flange 76a may be constucted preferably in such a manner that a flange-shaped enlargement is provided on top of the pin 76; the bore 1i is kept larger coersponding to that flange-shaped enlargement the height of which corresponds to the thickness of the sheet metal panel 1 and fills this bore 1i completely.

On this flange a further, even larger flange is provided, which after the termination of the welding operation, i.e. after the fusion of the welding pin 76, bears on the upper panel 1 in the manner of a rivet head, and presses said upper panel on the decorative lower panel 2. Welding thus takes place, instead of between the two panels 1 and 2, between the flange portion of the welding pin 76 and the lower panel 2.

Sheet metals of equal or different composition, e.g. steel with brass or copper, steel with aluminum or brass with copper may be connected, etc. and likewise sheet metals of widely different thicknesses. A requirement consists in that owing to appropriate dimensioning of the contact pins or the like, in accordance with the composition of the metal, the resistance of transition between the sheet metals is so high that the welding current is forced substantially to jump the air gap originally determined by the welding pin in the form of an electric arc and thus superficially to melt the milled surfaces.

Figure 36:
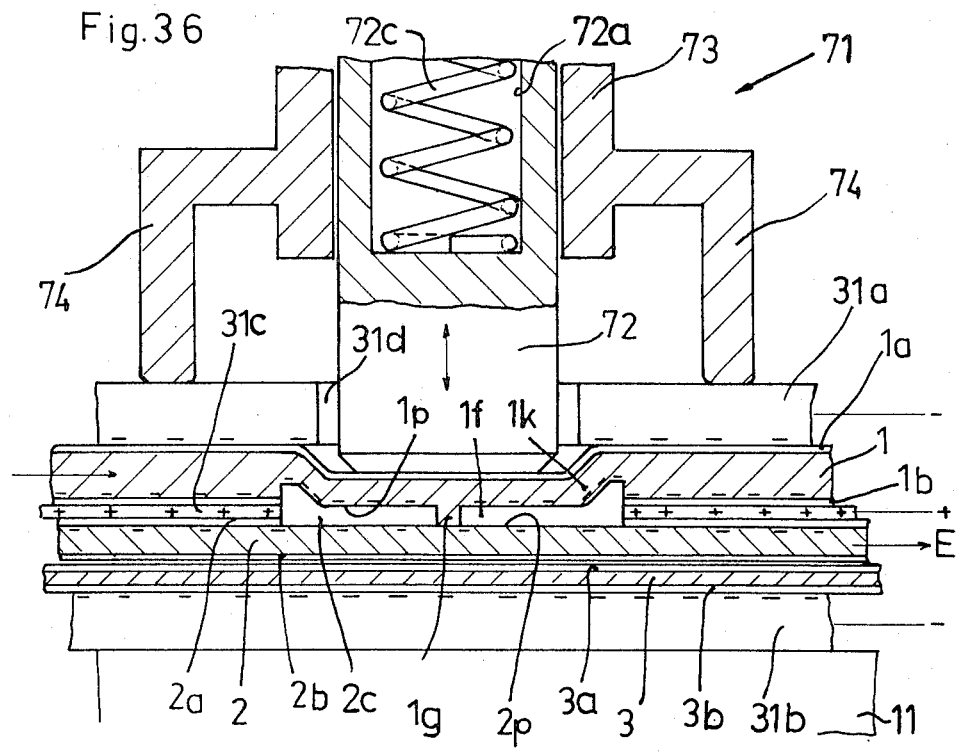
FIG. 36 is a section of a prepared welding spot for two sheet metal panels, each coated on both sides, with a current displacement device comprising capacitor-plates and -foil, with the welding device superimposed.

Further relief of the outer coatings may be attained by displacement of the flow of current by the aid of capacitor plates. In the embodiment of FIG. 36 an upper panel 1 with the coatings 1a, 1b has on its under side a milled recess 1f with a welding pin 1g left standing therein, and a lower panel 2 with the coatings 2a, 2b has a stripped zone 2c on top, panel 1 serving as a holder panel, and panel 2 as a lining. The panel 2 is connected, e.g. by a adhesive, to a thin decorative panel 3 with coatings 3a, 3b. At least one capacitor foil 31c is inserted between the panels 1 and 2 and above the panel 1 as well as underneath the panel 3 a capacitor plate 31a, 31b, respectively, is arranged. The lower capacitor plate 31b rests on a table 11. On top of the upper capacitor plate 31a a welding deivce 71 is placed, which comprises a presser punch 72 guided in an insulating tube 73 mounted on a tripod 74. A spring 72c engages in a bore 72a of the presser punch. The presser punch can pass through a bore 31d of the upper capacitor plate 31a and bear on the upper panel 1. In order to bring the welding pin 1g into the correct distance from the blank sheet metal surface 2p, the sheet metal 1 is provided at the welding zone with a downward depression 1k. The sheet metal 1 is connected to a capacitor pulse welding plant and the sheet metal 2 is earthed. The capacitor plates are connected to one pole of a voltage source and the capacotor foil 31c interposed in the middle between them to the other pole thereof. Firstly the voltage source for the capacitor plates is to be switched on, whereby electric fields are built up from the outer capacitor plates towards the capacitor foil lying in the middle between them. When switching-on the welding current, the same is displaced from the outsides of the panels 1 and 2 towards their insides, and is directed, reinforced, on to the blank areas 1p, 2p. At the same time the presser punch 72 is released, the same jerks from outside against the sheet metal 1, having the welding pin 1g on its underside, effects the igniting of the electric arcs, and welds the blank sheet metal surfaces 1p, 2p to one another. The outer coatings of the panels 1 and 2, and in any case the outer coating 3b of the panel 3 thus remain undamaged.

Figure 37:
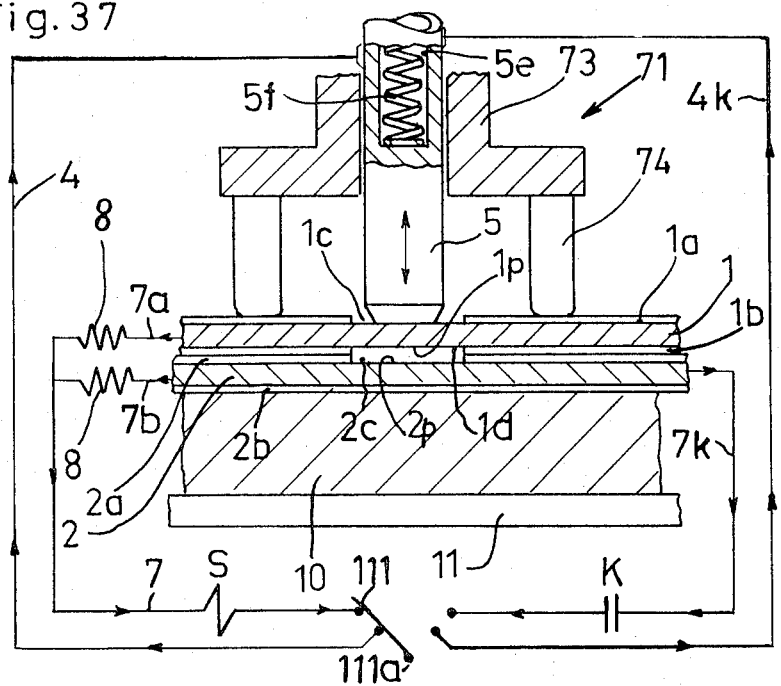
FIG. 37 is a section of a prepared welding spot with a welding device superimposed and a pre-warming device.

Shortening of the welding period and/or reduction of the energy required for the welding may be attained also by prewarming the holder panel. In the embodiment of FIG. 37 an upper holder panel 1 with coatings 1a, 1b has on top a stripped zone 1c, and on its underside a stripped zone 1d, and a decorative panel 2 with coatings 2a, 2b lying underneath has on top a stripped zone 2c. This panel rests on a table 11 through a cooling plate 10. On the panel 1 a welding device 71 is placed, which comprises an electrode 5 guided vertically slidably in an insulating tube 73 mounted on a tripod 74. The electrode is biased by a spring 5f engaging in a blind bore 5e thereof. One pole of a secondary circuit S of a pre-warming plant is connected by a cable 7a through a regulating resistor 8 to the sheet metal 1, and if desired by a cable 7b, likewise through a regulating resistor 8, to the sheet metal 2, the other pole of it being connected to the electrode 5 by a cable 4. Moreover, one pole of a capacitor pulse welding plant K is connected by a cable 4K to the electrode 5, and the other pole thereof is connected to the sheet metal 2 by a cable 7k. A switch 111 is pivotable about a pivot 111a into a lefthand side end position for switching-on the pre-warming plant, and into a righthand side end position for switching-on the welding plant. When switching on the pre-warming plant, the current flows through the electrode 5 loosely resting on the sheet metal 1 into the latter, and from there back through the cable 7a. The switch 111 is reversed by a time control so as to switch on the welding current. Thereby the spring 5f is released, the blank sheet metal surfaces 1p, 2p are made to approach each other, the electric arcs are ignited, and welding is performed under the pressure of said spring. The pre-warming of the panel 1 facilitates the downward deformation of its sheet metal. The outer coating 2b of the panel 2 thus remains undamaged.

Figure 38:
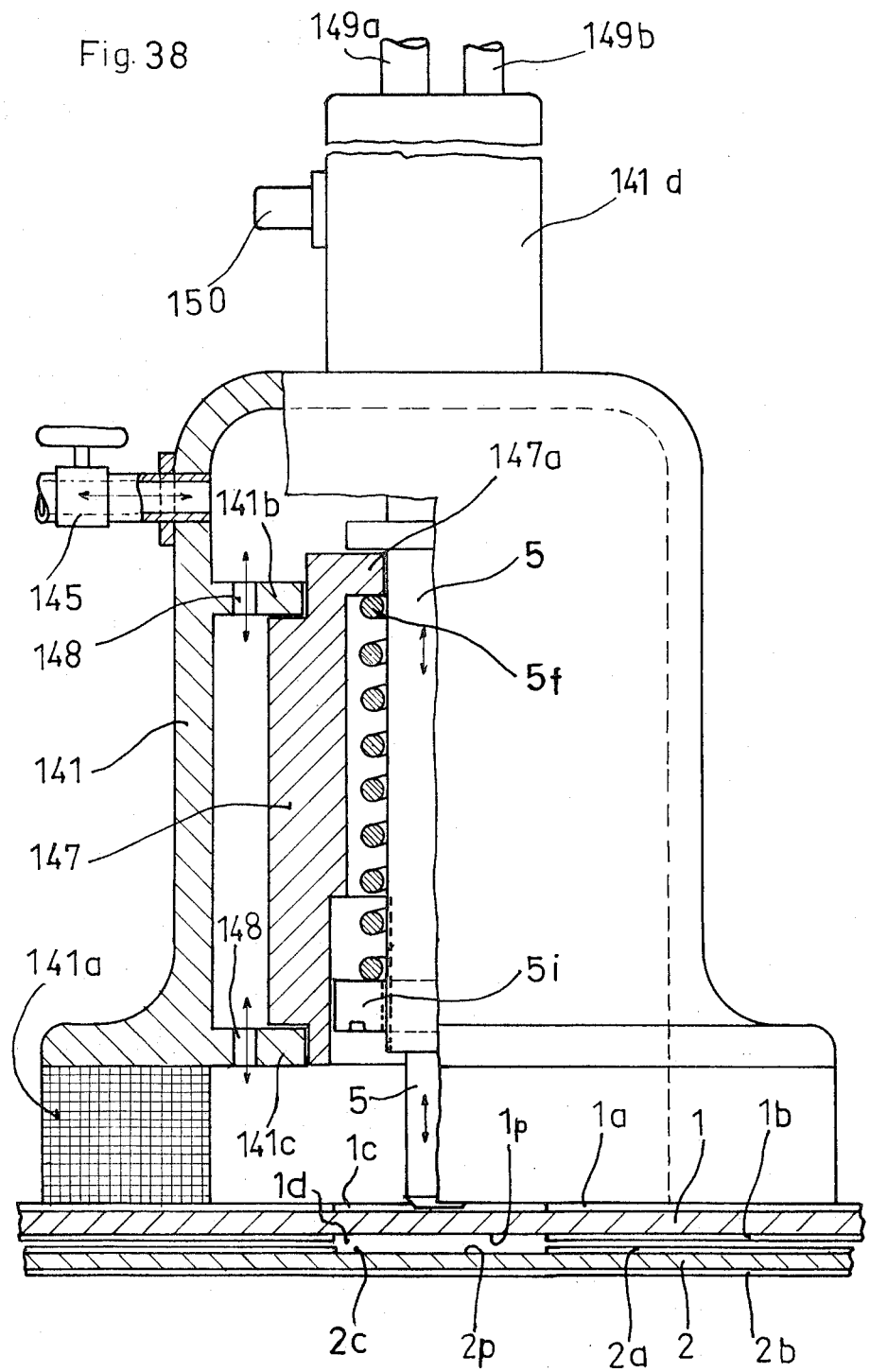
FIG. 38 shows a prepared welding spot with superimposed welding device within a vacuum bell.

For increasing the welding pressure of manually operated appliances, the welding device may be built into a vacuum bell. At the same time the vacuum reduces the resistance of transition and increases the lifetime of the electrode. In FIG. 38 an upper panel 1 with coatings 1a, 1b has a stripped zone 1c on top and a stripped zone 1d on its under side, and a lower panel 2 with the coatings 2a, 2b has on top a stripped zone 2c. A transparent vacuum bell 141 is placed with a high resilient seal 141a on to the upper panel, and is connected through a valve 145 to a source of vacuum. In the interior of the vacuum bell there are arranged an upper flange 141b and a lower flange 141c, each with air passage bores 148, which flanges hold an electrode guide 147. The upper portion 147a of said guide serves at the same time as an abutment for a compression spring 5f which biases the electrode 5 through an adjustment nut 5i. An upper extension of 141d encloses the vacuum bell, a switch 150 and the current supply — and control cables 149a, 149b. For the welding operation the electrode and vacuum bell are to be placed over the welding zone, if desired with the aid of a template, and the bell is evacuated. Thereby the seal 141a is compressed, and the electrode 5 is pressed on to the stripped zone of the panel 1. When switching on the welding current, electric arcs are ignited between the blank sheet metal surfaces 1p, 2p, and the same are welded to one another by the pressure of the electrode. The outer coating 2b of the panel 2 thus remains undamaged.

Instead of pressing the welding electrodes or presser punch, which does not carry current, on to the panel by the vacuum bell, electromagnets may be provided, which, when energized, adhere to the sheet metal to be welded and load the spring of the electrode.

Alternatively the welding appliance may be held by electromagnets on the sheet metal panel. These electromagnets may form the legs of a tripod. The electrode or the presser punch may be pressed on to the welding zone by compressed air or by another electromagnet instead of by a spring.

Such vacuum bells are suitable also for the housing of milling devices, drilling devices, presser devices, punching devices, frame arrangements and the like in any local arrangement desired on the coated surfaces.

Figure 39A:
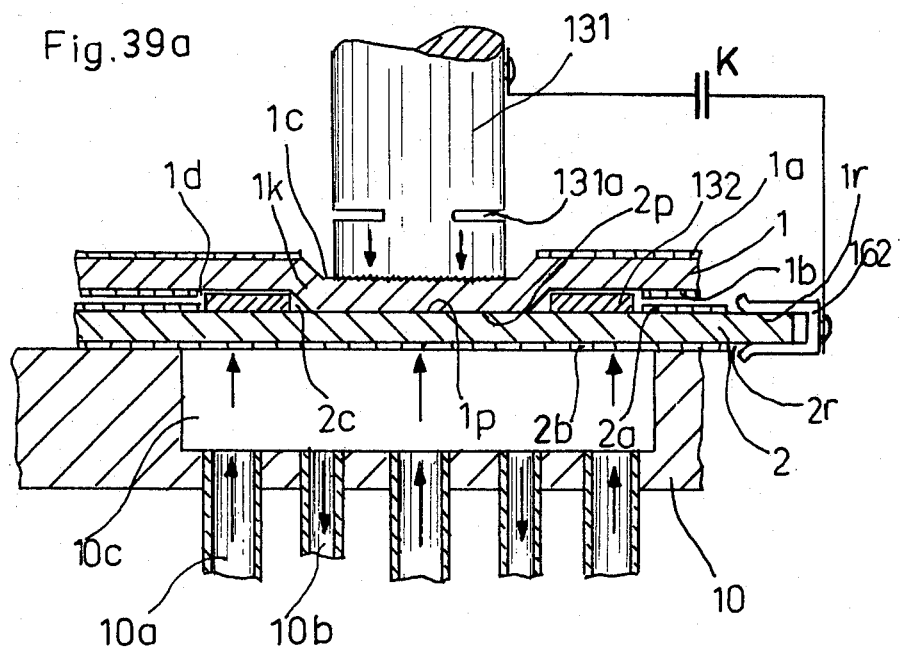

The igniting of the electrical arcs may be alternatively affected by temporarily lifting off the upper panel by the aid of an automatic mechanism as used in pin-welding appliances. For this purpose firstly a lifter pin is welded on top of the upper sheet metal panel. In FIG. 39 an upper sheet metal panel 1 with coatings 1a, 1b is provided on top with a stripped zone 1c and on the underside with a longer stripped zone 1d, and with a downwardly directed depression 1k on the welding zone the height of which depression slightly exceeds twice the thickness of a coating. Within the stripped area a lifter pin 131 which has notches 131a is welded to the sheet metal 1. The welding zone of the prepared panel 1 is placed on the stripped zone 2c of a second panel 2 having coatings 2a, 2b, which rests on a cooling plate 10 having a recess 10c and coolant supply- and drain-pipes 10a and 10b, respectively. Between the sheet metals 1, 2 a ring 132 of a high melting point material is placed around the welding area fo damming up the melt. For melting, a bolt-welding appliance (not shown) similar to FIG. 35 is to be put on, and the lifter pin is to be clamped therein. When switching-on the current, the panel 1 is raised by the automatic lifting mechanism e.g. by an electromagnet, whereby the electric arcs are ignited; by switching off the current in the next moment the panel 1 is released, the blank sheet metal areas 1p, 2p are pressed against and welded to each other. Subsequently the lifter pin is broken off at its notches.

When using coated sheet metal panels for outdoor use e.g. for the lining of the facades of buildings or for vehicles, the welding zone has to be protected from corrosion. For this purpose the sheet metal panels may be provided with adhesive around the welding zone, or may be cemented to each other by the interposition of rings, self-adhesive on both surfaces, or of perforated margin-strips. The most economic way is the use of an interposed foil, self-adhesive on both surfaces, and provided with a protective paper for the stripping of the coating. After the stripping, the protective paper is pulled off, the second panel is superimposed with its prepared welding zone, and welding is carried out.

Figure 40:
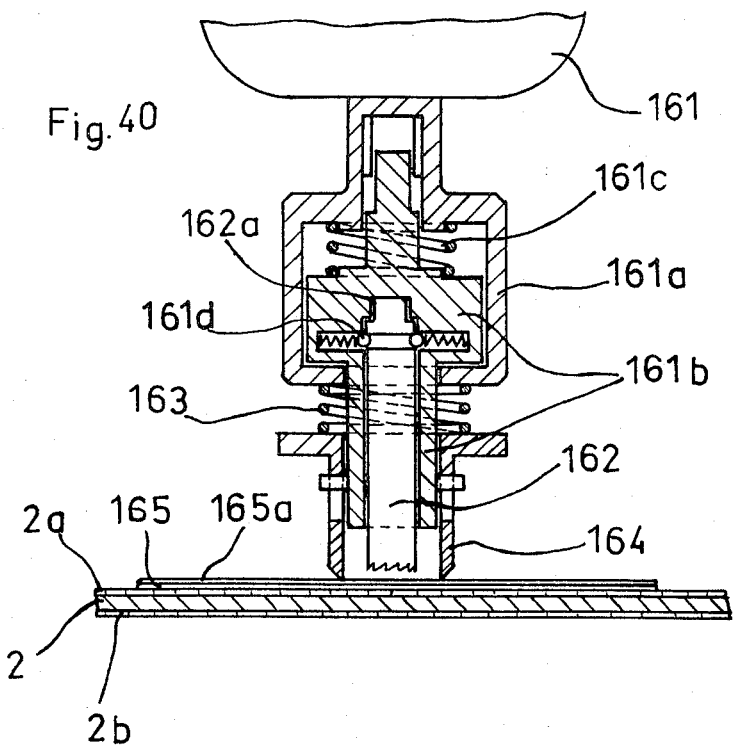
FIG. 40 shows the preparation of the welding area of a lower panel with the aid of a sealing foil stuck to it.
Figure 41:
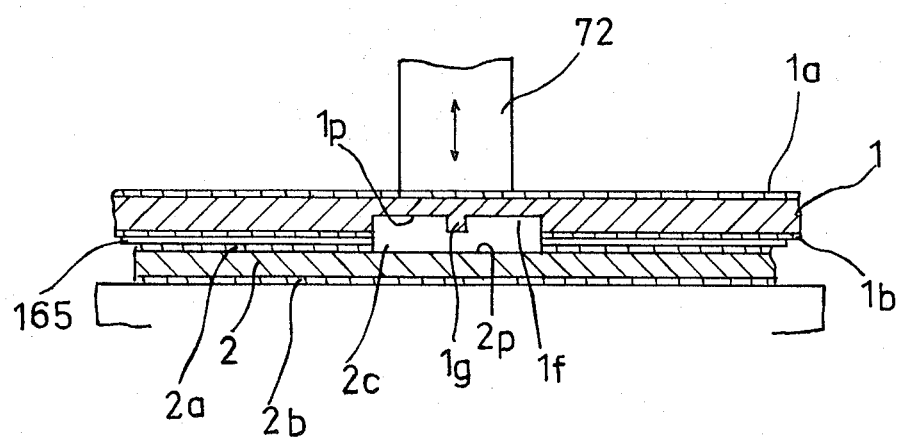
FIG. 41 shows the welding of a lower panel with a sealing foil stuck to it to an upper panel, by the aid of a welding pin.
Figure 1A:
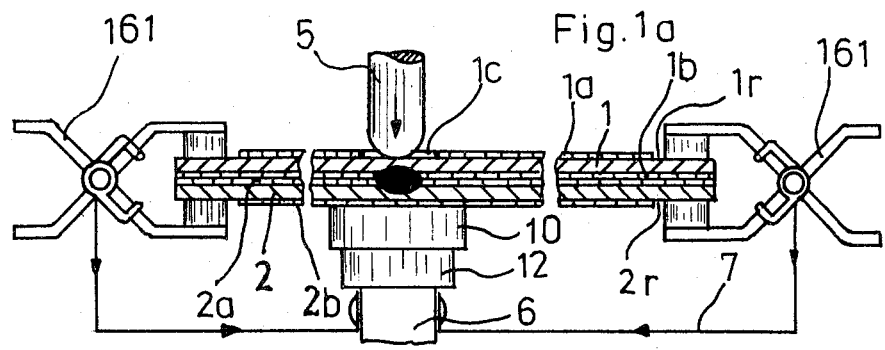
Figure 2A:
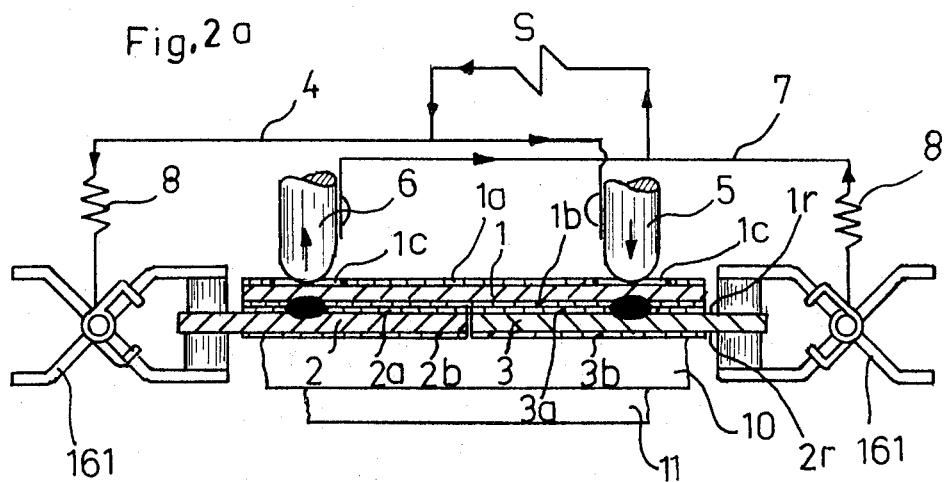
Figure 3A:
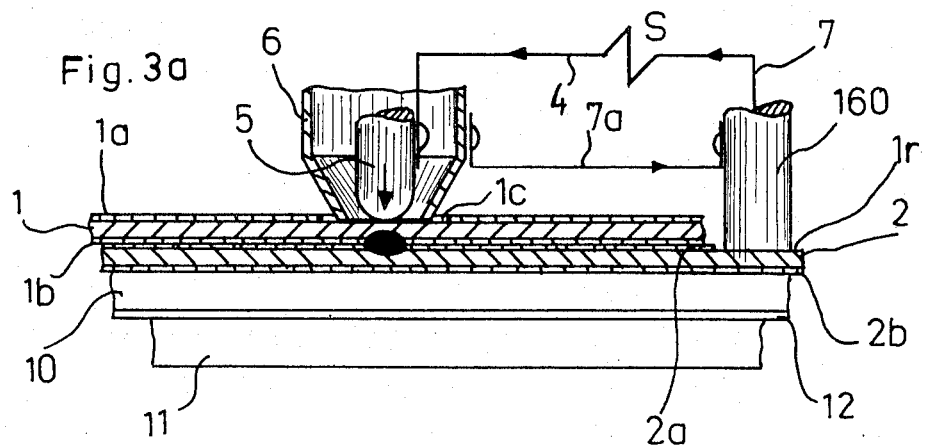
Figure 17A:
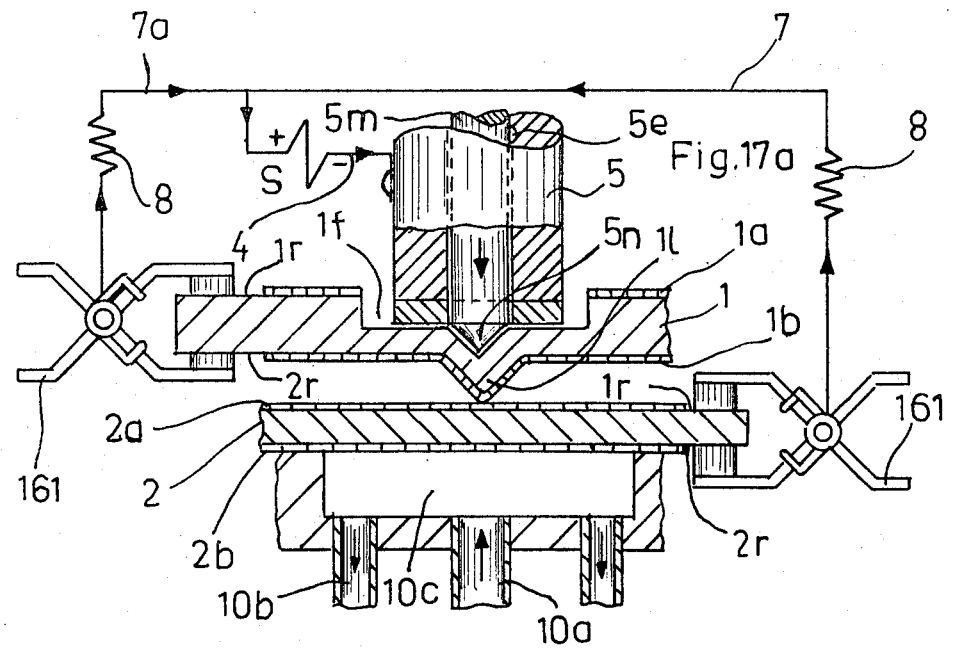
Figure 19A:
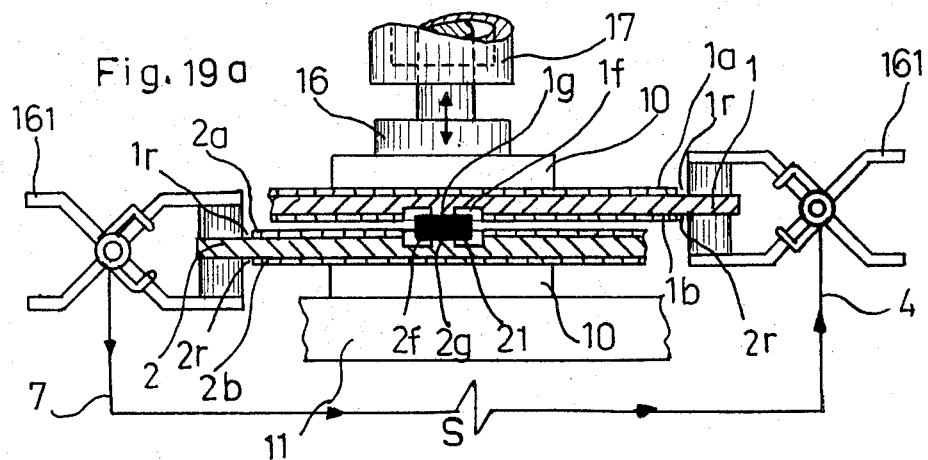
Figure 20A:
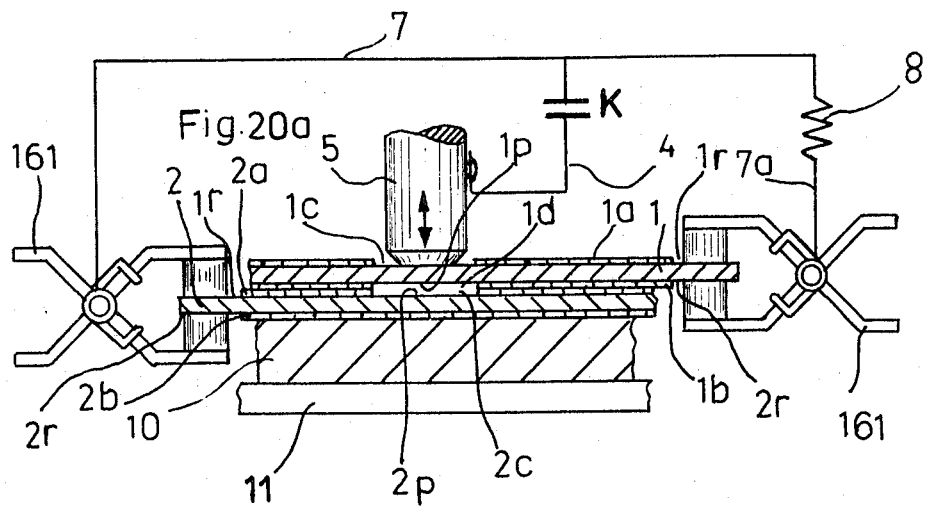
Figure 25A:
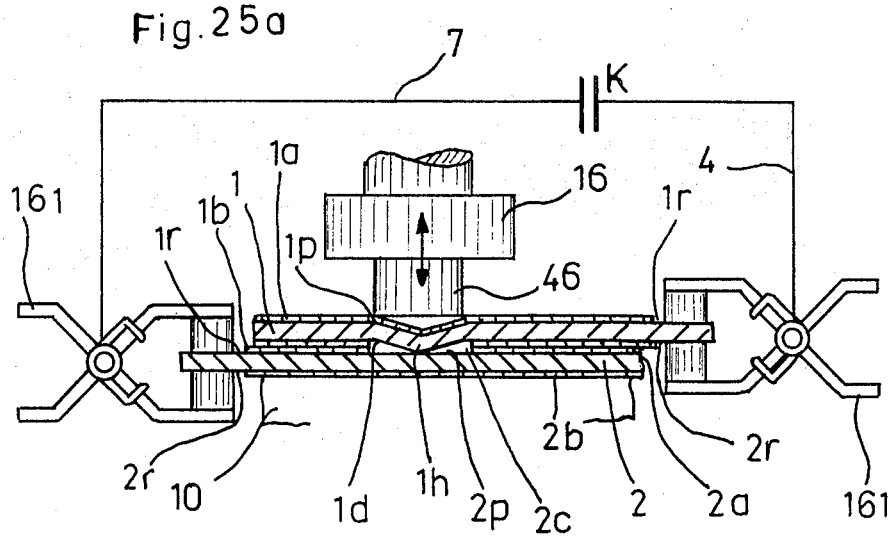
Figure 26A:
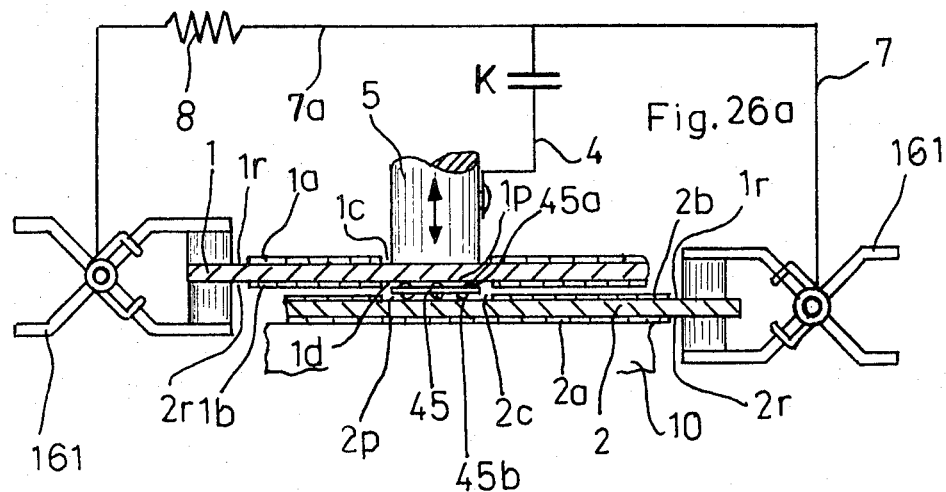
Figure 27A:
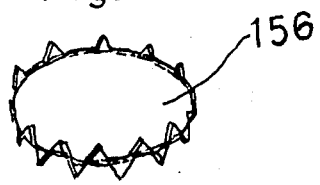
Figure 29A:
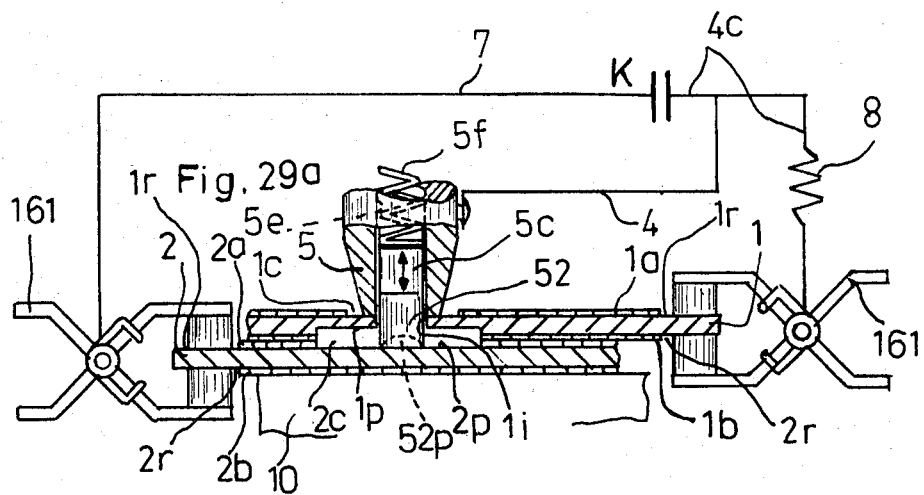
Figure 30A:
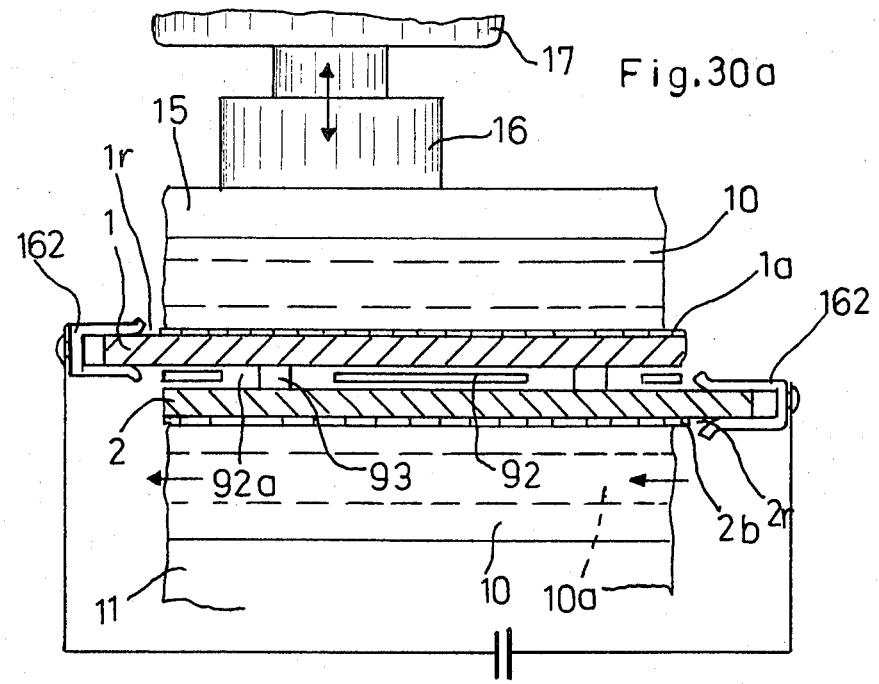

In the example of FIG. 40 a self-adhesive foil 165 is stuck on a lower panel 2 having coatings 2a, 2b, which foil has a protective paper 165a on top. The stripping of the upper coating 2a is carried out by means of a milling machine 161 comprising a chuck casing 161a, a chuck 161b, a compression spring 161c and spring-biased ball detent 161d, which keeps the inserted milling cutter 162 in position, which cutter has a flattened end 162a engaging in the chuck 161b. Around the lower portion of the chuck 161b a tube 164 having an annular cutting edge is arranged slidably and coupled to said chuck for rotation by means of a transverse pin, and is axially biase by a compression spring 163. When pressing down the milling machine 161, the layers 165a, 165 and 2a are firstly severed by the annular cutting edge of the tube 164 and then stripped by the milling cutter 162, the protective paper 165a preventing the adhesive layer from sticking to the milling cutter 162. The stripped zone 2c thus formed has a blank metal surface 2p. Subsequently an upper sheet metal panel 1 is superimposed having coatings 1a, 1b and a welding zone prepared, e.g. for arc welding, which zone may consist in a welding pin 1g left standing in a milled recess 1f. After an indirect connection of both sheet metal panels to the secondary circuit of a welding plant and switching on the current, electric arcs are ignited by the aid of the presser punch 72 and of the welding pin 1g, and the blank areas 1p, 2p of the sheet metal panels are welded to each other. The outer coatings 1a, 2b thus remain undamaged.

Pins, points, straight or circular webs having sharp edges and the like may be produced, instead of by milling, by pressing, stamping, embossing, punching or the like.

The deformation of the welding areas thus prepared may be effected by the pressure of an electrode or of presser punches, which do not carry current, either immediately while welding or previously, before or after the formation of the pins, points, webs or the like.

Particularly when welding panels consisting of different sheet metals to each other these metals are preferably to be alloyed with other metals in such a manner that an optimum results of physical properties, particularly of strength. The same applies when using inserts.

Electrical currents of any kind, particularly the discharge currents of capacitors may be used e.g. those generated by capacitor pulse machines.

As is evident, FIGS. 1a to 5a, 7a, 11a, 14a, 17a, 19a to 20a, 25a, 26a, and 29a, 30a, and 32a to 39a differ from the corresponding FIGS 1 to 5, 7, 11, 14, 17, 19, 21, 25, 26, 29, 30, and 32 to 39 by showing stripped auxiliary contact areas or spots 1r and, if desired, 2r provided on the surfaces of the sheet metal panels to be welded. Either an auxiliary contact electrode 160 or contact tongs 161 or contact clamps 162 are shown which conduct the preheating current and/or the welding current into the sheet metal panel or panels. Otherwise the Figures indicated by the suffix a correspond to the Figures without said suffix. The drawings clearly show the use of welding electrodes in FIGS. 1 to 5, 12, 14, 17, 18, 20, 26, 28, 29, 33 to 35, and 37 to 39 and the corresponding FIGS. 1a to 5a, 14a, 17a, 20a, 26a, 28a, 29a, 33a to 35a, and 37a to 39a, while the FIGS. 6, 7, 10, 11, 13, 15, 16, 19, 25, 30, 32, and 36 and the corresponding FIGS. 7a, 11a, 19a, 25a, 30a, 32a, and 36a illustrate the embodiment of the present invention in which the electric current is not supplied by a welding electrode but through the sheet metal panel. Conducting the welding current through at least one sheet metal panel according to the present invention, as is evident from the drawings, has the effect that at least one of the outer coatings remains undamaged. Thus the welding process of the present invention is of the greatest importance since heretofore it was not possible to effect welding of coated sheet metal panels without destruction of the coatings.

It may be pointed out that at least one of the outer coatings must be stripped at the welding area or spot if the inner coatings have not been stripped. The welding electrode is then placed upon the stripped area or spot. An auxiliary contact device, such as an electrode, tongs, clamps, or the like conduct a preheating current through the sheet metal panel upon which the welding electrode is placed, so as to cause melting of the inner coating or coatings of plastic material, inorganic layers such as oxide or phosphate layers, or of metallic coating such a zinc, tin, or the like coatings. The pressure of the welding electrode then pushes the molten intermediate coating or coatings away from the welding area or spot and effects contact of the one sheet metal panel with the other sheet metal panel so that welding takes place. The other sheet metal panel is also connected with a contact device so that the welding current after the inner coating or coatings have become molten and have been pushed away from the welding area or spot, the welding current passes through the welding area or spot and is conducted through the other sheet metal panel parallel to the first sheet metal panel to the counterpole.

I claim:

1. In a process of connecting, by the electrical fusion of a metal, sheet metal panels and the like articles coated on at least one surface with a layer of material differing from the sheet metal, at least one of said layers being an outer layer on superposing said sheet metal panels the improvement which consists in
   a. conducting the welding current from one pole of a current souce directly by means of a first contact device attached to a surface area on one of said superposed metal panels, said surface area being stripped of said coating, into and through said first sheet metal panel essentially parallel to its surface to and through the predetermined welding area of said first sheet metal panel and
   b. causing the welding current to pass from said welding area to and through the predetermined welding area of the second superposed sheet metal panel through said second sheet metal panel essentially parallel to its surface and through a second contact device attached to said second sheet metal panel to the other pole of the current source,
   c. thereby effecting welding connection of the two sheet metal panels with each other without substantially affecting at least one of the outer layers of said coated sheet metal panels.

2. The process of claim 1, in which the layer of a material differing from the sheet metal is an insulating layer.

3. The process of claim 2, in which the insulating layer is a plastic layer.

4. The process of claim 2, in which the insulating layer is an oxide layer.

5. The proces of claim 1, in which the layer of a material differing from the sheet metal is a layer of a metal of a lower melting point than that of the sheet metal.

6. The proces of claim 1, in which the layer of a material differing from the sheet metal is a layer of a metal capable of alloying with the welding electrode.

7. The process of claim 1, in which the contact device attached to a surface area of at least one of said metal panels is an auxiliary contact electrode.

8. The process of claim 1, in which the contact device attached to a surface area of at least one of said metal panels is a contact tong.

9. The process of claim 1, in which the contact device attached to a surface area of at least one of said metal panels is a contact clamp.

10. The process of claim 1 additionally comprising the step of
   d. cooling the coating of the outer surface of at least one of said panels.

11. The process of claim 1, in which electrical fusion of the sheet metal is effected by electrical resistance welding.

* * * * *